(12) United States Patent
Jiang et al.

(10) Patent No.: US 7,707,165 B1
(45) Date of Patent: Apr. 27, 2010

(54) SYSTEM AND METHOD FOR MANAGING DATA VERSIONS IN A FILE SYSTEM

(75) Inventors: Tianyu Jiang, Export, PA (US); Narayana R. Tummala, Gibsonia, PA (US)

(73) Assignee: NetApp, Inc., Sunnyvale, CA (US)

(*) Notice: Subject to any disclaimer, the term of this patent is extended or adjusted under 35 U.S.C. 154(b) by 900 days.

(21) Appl. No.: 11/008,375

(22) Filed: Dec. 9, 2004

(51) Int. Cl.
G06F 12/00 (2006.01)
(52) U.S. Cl. .................... 707/203; 707/201; 715/229
(58) Field of Classification Search .......... 707/104.1, 707/102, 10, 203, 201, 100; 715/229
See application file for complete search history.

(56) References Cited

U.S. PATENT DOCUMENTS

| | | | |
|---|---|---|---|
| 4,156,907 A | 5/1979 | Rawlings et al. | |
| 4,399,503 A | 8/1983 | Hawley | |
| 4,570,217 A | 2/1986 | Allen et al. | |
| 4,598,357 A | 7/1986 | Swenson et al. | |
| 4,688,221 A | 8/1987 | Nakamura et al. | |
| 4,698,808 A | 10/1987 | Ishii | |
| 4,761,785 A | 8/1988 | Clark et al. | |
| 4,805,090 A | 2/1989 | Coogan | |
| 4,837,675 A | 6/1989 | Bean et al. | |
| 4,864,497 A | 9/1989 | Lowry et al. | |
| 4,896,259 A | 1/1990 | Jacobs et al. | |
| 4,899,342 A | 2/1990 | Potter et al. | |
| 4,989,206 A | 1/1991 | Dunphy, Jr. et al. | |
| 5,124,987 A | 6/1992 | Milligan et al. | |
| RE34,100 E | 10/1992 | Hartness | |
| 5,155,835 A | 10/1992 | Belsan | |
| 5,163,131 A | 11/1992 | Row et al. | |
| 5,202,979 A | 4/1993 | Hillis et al. | |
| 5,278,979 A | 1/1994 | Foster et al. | |
| 5,426,747 A | 6/1995 | Weinreb et al. | |
| 5,581,724 A | 12/1996 | Belsan et al. | |
| 6,279,004 B1 * | 8/2001 | Lee et al. ................... 707/100 |
| 6,289,356 B1 * | 9/2001 | Hitz et al. .................. 707/201 |
| 6,574,657 B1 * | 6/2003 | Dickinson .................. 709/203 |
| 6,631,386 B1 * | 10/2003 | Arun et al. ................. 707/203 |
| 6,636,879 B1 | 10/2003 | Doucette et al. | |
| 6,671,773 B2 | 12/2003 | Kazar et al. | |
| 6,983,296 B1 * | 1/2006 | Muhlestein et al. ........ 707/206 |
| 6,993,539 B2 | 1/2006 | Federwisch et al. | |

(Continued)

OTHER PUBLICATIONS

Administration Guide found at http://www.openafs.org/pages/doc/AdminGuide/auagd010.htm, visited on Mar. 2, 2005.

(Continued)

Primary Examiner—Hosain T Alam
Assistant Examiner—Leon Harper
(74) Attorney, Agent, or Firm—Cesari and McKenna, LLP

(57) ABSTRACT

A system and method manages data versions in a file system. A data version field associated with a direct block pointer in each level 1 indirect block stores a data version associated with the data contained in the direct block. When data is modified subsequent to the creation of a persistent consistency point image, the data version is incremented to a next data version value to signify that the data has been modified. Replication is aided by the ease of identifying modified data blocks by examining the data version field associated with each block.

43 Claims, 14 Drawing Sheets

U.S. PATENT DOCUMENTS

| | | | | |
|---|---|---|---|---|
| 7,039,663 | B1* | 5/2006 | Federwisch et al. | 707/205 |
| 7,043,486 | B2* | 5/2006 | Cope | 707/100 |
| 7,111,021 | B1* | 9/2006 | Lewis et al. | 707/202 |
| 7,162,662 | B1* | 1/2007 | Svarcas et al. | 714/15 |
| 7,197,490 | B1* | 3/2007 | English | 707/1 |
| 7,313,720 | B1* | 12/2007 | Eng et al. | 714/6 |
| 2002/0091670 | A1* | 7/2002 | Hitz et al. | 707/1 |
| 2002/0194529 | A1* | 12/2002 | Doucette et al. | 714/6 |
| 2003/0182313 | A1* | 9/2003 | Federwisch et al. | 707/200 |
| 2003/0182322 | A1* | 9/2003 | Manley et al. | 707/201 |
| 2005/0065986 | A1* | 3/2005 | Bixby et al. | 707/204 |
| 2005/0246397 | A1* | 11/2005 | Edwards et al. | 707/204 |
| 2006/0036656 | A1* | 2/2006 | Mercer | 707/203 |
| 2006/0161530 | A1* | 7/2006 | Biswal et al. | 707/3 |

OTHER PUBLICATIONS

Basilico, et al., *Error Correction System Using "Shadow Memory,"* IBM Technical Disclosure Bulletin, May 1984, pp. 5792-5793.

Bitton, Dina, *Disk Shadowing*, Proceedings of the 14$^{th}$ VLDB Conference, LA, CA (1988).

Blasgen, M.W. et al., *System R:An architectural Overview*,Reprinted from IBM Systems Journal vol. 20, No. 1, 1981© 1981, 1999.

Borenstein, Nathaniel S., *CMU's Andrew project a retrospective*, Communications of ACM, (39)12, Dec. 1996.

Brown, Mark R. et al., *The Alpine file system*, ACM Transactions on Computing Systems, 3(4):261-293, Nov. 1985.

Chen, Peter M., et al., *An Evaluation of Redundant Arrays of Disks Using an Amdahl 5890* Performance Evaluation, pp. 74-85, 1990.

Chutani, Sailesh, et al., *The Episode file system*, In Proceedings of the USENIX Winter 1992.

Clark, B.E., et al., *Application System /400 Performance Characteristics*, IBM Systems Journal, 28(3): 407-423, 1989.

Data Sheet for the Check Point Software Technologies product Flood-Gate-1 (1997).

Dibble, Peter C., et al., Beyond Striping: The Bridge Multiprocessor File System, Computer Science Department, University of Rochester, Aug. 11, 1989.

Douglis, Fred, et al., *A comparison of two distributed systems: Amoeba and Sprite*—Computing Systems, 4(4), Fall 1991, pp. 353-385 ?(article I have has no date or cite).

Gait, Jason, *Phoenix: A Safe In-Memory File System*. Communications of the ACM, 33(I):81-86, Jan. 1990.

Hartman, John H. et al., *Performance Measurements of a Multiprocessor Sprite Kernel*, Proceedings of the USENIX Conference, 1990.

Hitz, Dave et al., *File System Design for an NFS File Server Appliance*, Technical Report 3002, Rev. C395, presented Jan. 19, 1994.

Howard, John H, et al. *Scale and Performance in a Distributed File System*, Carnegie Mellon University, CMU-ITC-87-068, Aug. 5, 1987.

Howard, John, H. et al., *Scale and performance in a distributed file system*, ACM Trans. Computer. System., 6(1), Feb. 1988 pp. 51-81.

Howard, John H., *An Overview of the Andrew File System*, Carnegie Mellon University, CMU-ITC-88-062.

*The IBM System/38*, Chapter 8, pp. 137-15.

Isomaki, Markus, *Differentiated Service for the Internet*, Department of Technical Physics and Mathematics, May 9, 1998.

Kazar, Michael L., et al., *Decorum File System Architectural Overview*, USENIX Summer Conference, Anaheim, California, 1990.

Lomet, David., et al., *The performance of a multiversion access method*, ACM SIGMOD International Conference on Management of Data 19:353-363.

Lorie, Raymond, A, *Physical integrity in a large segmented database*, ACM Trans. Database Systems, (2)1: 91-104, Mar. 1977.

Lorie, RA, *Shadow Page Mechanism*, IBM Technical Disclosure Bulletin, Jun. 1986, pp. 340-342.

McKusick, Marshall Kirk, et al., *A Fast File System for UNIX*, Computer Science Division, Department of Electrical Engineering and Computer Sciences, Univ. of CA, Berkley, Feb. 18, 1994.

Miller, Ethan L., et al., *RAMA:A File System for Massively Parallel Computers*, 12$^{th}$ IEEE Symposium on Mass Storage Systems, Monterey CA, Apr. 1993, pp. 163-168.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., et al, *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington). Published as Operating Systems Review, 19(5):51-62, Dec. 1985.

Muller, Keith, et al., *A High Performance Multi-Structured File System Design*, In Proceedings of the 13th ACM Symposium on Operating Systems Principles, Oct. 1991, pp. 56-67.

Ousterhout, John K. et al., *The Sprite Network Operating System*, Computer Science Division, Department of Electrical Engineering and Computer Sciences, Univ. of CA, Berkley, Nov. 19, 1987.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Ousterhout, John, *Why Aren't Operating Systems Getting Faster as Fast as Hardware?*, Digital WRL Technical Note TN-11, Oct. 1989.

Ousterhout, John, *A Brief Retrospective On The Sprite Network Operating System*, found at http://www.cs.berkeley.edu/projects/sprite/retrospective.html, visited on Mar. 11, 2005.

Patterson, D., et al., *A Case for Redundant Arrays of Inexpensive Disks (RAID),* Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID),* SIGMOD International Conference on Management of Data, Chicago, IL, USA, Jun. 1-3, 1988, SIGMOD Record 17(3):109-16 (Sep. 1988)

Peterson, Zachary Nathaniel Joseph, *Data Placement for Copy-on-Write Using Virtual Contiguity*, University of CA, Santa Cruz, Master of Science in Computer Science Thesis, Sep. 2002.

Quinlan, Sean, *A Cached WORM File System*, Software-Practice and Experience, 21(12):1289-1299 (1991).

Redundant Array of Independent Disks, from Wikipedia, the free encyclopedia, found at http://en.wikipedia,org/wiki/RAID, visited on Mar. 9, 2005.

Rosenberg, J., et al., *Stability in a Persistent Store Based on a Large Virtual Memory*, In Security and Persistence, Rosenber, J. & Keedy, J.L. (ed), Springer-Verlag (1990) pp. 229-245.

Rosenblum, Mendel, et al., *The LFS Storage Manager*, Computer Science Division, Electrical Engin. And Computer Sciences, Univ. of CA, presented at Summer '90 USENIX Technical Conference, Anaheim, CA Jun. 1990.

Rosenblum, Mendel, et al, The *Design and Implementation of a Log-Structured File System* Jul. 24, 1991 pp. 1-15.

Rosenblum, Mendel, et al., *The Design and Implementation of a Log-Structured File System*, , In Proceedings of ACM Transactions on Computer Systems, (10)1:26-52, Feb. 1992.

Sandberg, Russel et al., *Design and implementation of the Sun Network Filesystem*. In Proc. Summer 1985 USENIX Conf., pp. 119-130, Portland OR (USA), Jun. 1985.

Santry, Douglas S., et al., *Deciding When to Forget in the Elephant File System*, Operating Systems Review, 34(5), (Dec. 1999) pp. 110-123.

Satyanarayanan, M., et al., *The ITC Distributed File System: Principles and Design*, In Proceedings of the 10th ACM Symposium on Operating Systems Principles, (19)5:56-67, Dec. 1985.

Satyanarayanan,.M.. *A survey of distributed file-systems*. Annual Review of Computing Science, 4(73-104), 1989.

Satyanarayanan, M., et al., *Coda: A highly available file system for a distributed workstation environment* Carnegie Mellon University, CMU-ITC.

Satyanarayanan, M., et al, *Coda: A highly available file system for a distributed workstation environment*. IEEE Transactions on Computers, 39(4):447-459, 1990.

Satyanarayanan, Mahadev, *Scalable, Secure, and Highly Available Distributed File Access*, Computer May 1990: 9-21.

Sidebotham, Bob, *Volumes: The Andrew File System Data Structuring Primitive*, EEUG Conference Proceedings, Manchester, UK, Autumn 1986.

User Guide found at http://www.openafs.org/pages/doc/UserGuide/auusg004.htm, visited on Mar. 2, 2005.

Welch, Brent B., et al., *Pseudo Devices: User-Level Extensions to the Sprite File System*, Computer Science Division, Department of Electrical Engineering and Computer Sciences, Univ. of CA, Berkley, Apr. 1988.

Welch, Brent B., et al., *Pseudo-File-Systems*, Computer Science Division, Department of Electrical Engineering and Computer Sciences, Univ. of CA, Berkley, Oct. 1989.

Wittle, Mark, et al., *LADDIS: The next generation in NFS file server benchmarking*, USENIX Association Conference Proceedings, Apr. 1993.

Akyurek, Sedat, *Placing Replicated Data to Reduce Seek Delays*, Department of Computer Science, University of Maryland, UMIACS-TR-91-121, CS-TR-2746, Aug. 1991.

Bitton, Dina, *Disk Shadowing*, Proceedings of the $14^{th}$ VLDB Conference, LA, CA 1988.

Chaudhuri, Surajit, et al., *Self-Tuning Technology in Microsoft SQL Server*, Data Engineering Journal 22, 2 1999 pp. 20-27.

Chutani, Sailesh, et al., *The Episode File System*, In Proceedings of the USENIX Winter 1992.

Coyne, Robert A., et al., *Storage Systems for National Information Assets*, Proc. Supercomputing 92, Minneapolis, Nov. 1992, pp. 626-633.

Finlayson, Ross S., et al., *Log Files: An Extended File Service Exploiting Write-Once Storage* Department of Computer Science, Stanford University, Report No. STAN-CS-87-1177, Sep. 1987.

Gray, Jim, et al., *The Recovery Manager of the System R Database Manager*, ACM Computing Surveys, (13)2:223-242 1981.

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael Leon, *Synchronization and Caching Issues in the Andrew File System*, Carnegie Mellon University, CMU-ITC-88-063.

Kazar, Michael L., et al., *DEcorum File System Architectural Overview*, USENIX Summer Conference, Anaheim, California, 1990.

Kemper, Alfons, et al., *Performance Tuning for SAP R/3*, Data Engineering Journal 22, 2 1999 pp. 33-40.

Kent, Jack et al., *Optimizing Shadow Recovery Algorithms*, IEEE Transactions on Software Engineering, 14( 2): 155-168 , Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 Sep. 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM-File System*, Software-Practice and Experience, 21(12):1289-1299 1991.

Rosenblum, Mendel, et al., *The LFS Storage Manager*, Computer Science Division, Electrical Engineering And Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, 2 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, 2 1999 pp. 41-47.

Sidebotham, Bob, *Volumes: The Andrew File System Data Structuring Primitive*, EEUG Conference Proceedings, Manchester, UK, Autumn 1986.

Subramanian, Muralidhar, et al., *Performance Challenges in Object-Relational DBMSs*, Data Engineering Journal 22, 2 1999 pp. 28-32.

Weikum, Gerhard, et al., *Towards Self-Tuning Memory Management for Data Servers*, Data Engineering Journal 22, 2 1999 pp. 3-11.

West, Michael, et al. *The ITC Distributed File System: Prototype and Experience*, Carnegie-Mellon University, Technical Report CMU-ITC-040, Mar. 1985.

Zayas, Edward R, AFS-3 Programmer's Reference: Architectural Overview, Transarc Corporation, Pittsburgh, PA, 1.0 edition 1991.

Leverett et al., "Technique for Accelerating the Creation of a Point in Time Representation of a Virtual File System", U.S. Appl. No. 60/647,688, filed Jan. 27, 2005, 44 pages.

* cited by examiner

SYSTEM AND METHOD FOR MANAGING DATA VERSIONS IN A FILE SYSTEM

FIELD OF THE INVENTION

The present invention is directed to file systems and, in particular to managing data versions in a file system.

BACKGROUND OF THE INVENTION

A storage system is a computer that provides storage service relating to the organization of information on storage devices, such as disks. The storage system may be deployed within a network attached storage (NAS) environment and, as such, may be embodied as a file server. The file server or filer includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application, such as a database application, executing on a computer that "connects" to the filer over a computer network, such as a point-to-point link, shared local area network (LAN), wide area network (WAN), or virtual private network (VPN) implemented over a public network such as the Internet. Each client may request the services of the file system on the filer by issuing file system protocol messages (in the form of packets) to the filer over the network.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as meta-data, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data is then stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the SpinFS file system available from Network Appliance, Inc. of Sunnyvale, Calif. The SpinFS file system is implemented within a storage operating system having a protocol stack and associated disk storage.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. As described herein, a volume typically comprises at least one data disk and one associated parity disk (or possibly data/parity partitions in a single disk) arranged according to a RAID 4, or equivalent high-reliability, implementation.

A file system may have the capability to generate a snapshot of its active file system. An "active file system" is a file system to which data can be both written and read or, more generally, an active store that responds to both read and write I/O operations. It to should be noted that "snapshot" is a trademark of Network Appliance, Inc. and is used for purposes of this patent to designate a persistent consistency point image. A persistent consistency point image (PCPI) is a space conservative, point-in-time read-only image of data accessible by name that provides a consistent image of that data (such as a storage system) at some previous time. More particularly, a PCPI is a point-in-time representation of a storage element, such as an active file system, volume, virtual file system, file or database, stored on a storage device (e.g., on disk) or other persistent memory and having a name or other identifier that distinguishes it from other PCPIs taken at other points in time. A PCPI can also include other information (metadata) about the active file system at the particular point in time for which the image is taken. The terms "PCPI" and "snapshot" may be used interchangeably through out this patent without derogation of Network Appliance's trademark rights.

It is advantageous for the services and data provided by a storage system to be available for access to the greatest degree possible. Accordingly, some storage system environments permit data replication between a source storage system and one or more destination storage systems. Typically these replication systems generate a PCPI of the active file system and then replicate any changes between the PCPI and the target file system. A noted disadvantage of such replication techniques is the requirement to identify the changes between the replica stored on a destination storage system and the point in time image on the source storage system. One exemplary technique checks the file length and/or a timestamp of each file in a volume to identify whether the file has changed size or has been updated more recently than a given point in time. However, a noted disadvantage of such a technique is that it does not identify which data blocks within the file have been modified, thereby causing the replication system to transmit the entire file to the destination.

Another noted technique for performing replication between a source and destination storage system is described in U.S. Pat. No. 6,993,539, entitled SYSTEM AND METHOD FOR DETERMINING CHANGES IN SNAPSHOTS AND FOR TRANSMITTING CHANGES TO A DESTINATION SNAPSHOT, by Michael L. a Federwisch, et al., filed on Mar. 19, 2002 and issued on Jan. 31, 2006. In such a system, a PCPI is generated and the contents transferred to a destination as a baseline PCPI. At a later point in time, another PCPI is generated on the source. A block by block comparison is performed between the first and second PCPIs to identify changed blocks. Only the changed blocks are transmitted to the destination. However, a noted disadvantage of such a technique is that a block by block comparison of the two PCPIs must be performed, which is computationally intensive and may require a substantial amount of time.

SUMMARY OF THE INVENTION

The present invention overcomes the disadvantages of the prior art by providing a system and method for managing data versions in a file system. In an inode having both direct and indirect pointers, the inode is modified to include an inode version field and a direct version field. The direct version field contains a version number associated with direct blocks referenced (pointed to) by the inode, whereas the inode version field contains the highest version value for the direct blocks or any version value contained in an indirect block within a buffer tree of the inode. Each "leaf" indirect block, i.e., an indirect block that points to one or more data blocks, includes a data version field for each direct block pointer contained therein.

Illustratively, two different version values are maintained within the file system. A data version (DV) represents the current data in the file system, while a new data version (NDV) represents new data if the file system is changed. When data is written to a data container (such as a volume, file, etc), and if the DV is less than the NDV, the file system increments the version associated with the data to the NDV value and tags the new data with the NDV by, for example, storing the value in the indirect block associated with the data block pointer. When a PCPI is generated of the data container, the PCPI inherits the DV and NDV from the active file system. A PCPI generally preserves the data version of an active file system, however if the data version is equal to the new data version, the file system increments the new data version. Otherwise the data version and new data version remain unchanged. As a result, a PCPI does not directly change the to data version but instead indicates that the PCPI contains the same data as that in the active file system when the PCPI was generated.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Cluster Environment

Figure 1:
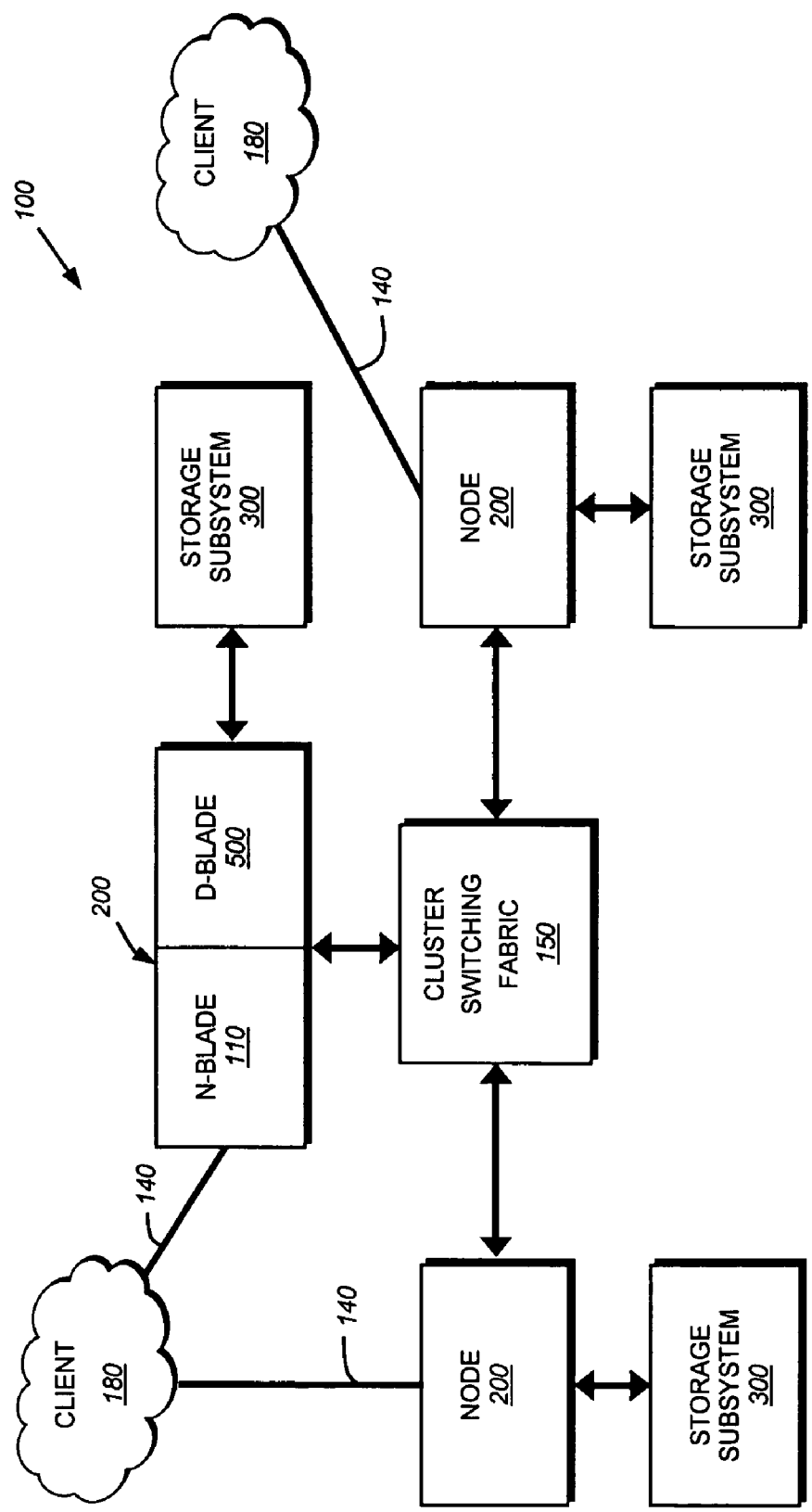
FIG. 1 is a schematic block diagram of a plurality of nodes interconnected as a cluster that may be advantageously used with the present invention.

FIG. 1 is a schematic block diagram of a plurality of nodes 200 interconnected as a cluster 100 and configured to provide storage service relating to the organization of information on storage devices of a storage subsystem. The nodes 200 comprise various functional components that cooperate to provide a distributed Spin File System (SpinFS) architecture of the cluster 100. To that end, each SpinFS node 200 is generally organized as a network element (N-blade 110) and a disk element (D-blade 500). The N-blade 110 includes a plurality of ports that couple the node 200 to clients 180 over a computer network 140, while each D-blade 500 includes a plurality of ports that connect the node to a storage subsystem 300. The nodes 200 are interconnected by a cluster switching fabric 150 which, in the illustrative embodiment, may be embodied as a Gigabit Ethernet switch. The distributed SpinFS architecture is generally described in U.S. Pat. No. 6,671,773 titled Method and System for Responding to File System Requests, by M. Kazar et al., issued on Dec. 30, 2003.

B. Storage Systems

Figure 2:
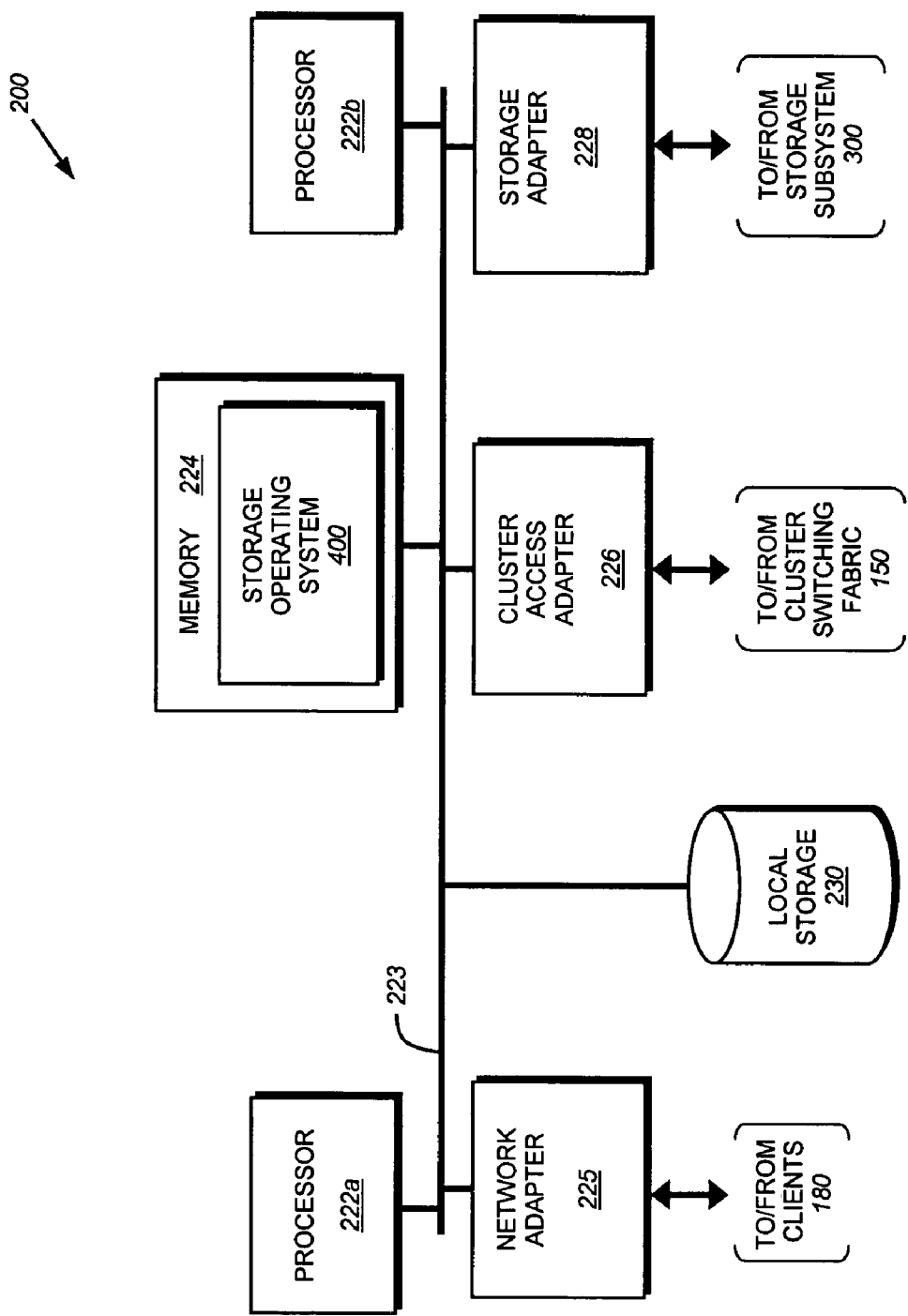
FIG. 2 is a schematic block diagram of a node that may be advantageously used with the present invention.

FIG. 2 is a schematic block diagram of a node 200 that is illustratively embodied as a storage system server comprising a plurality of processors 222, a memory 224, a network adapter 225, a cluster access adapter 226, a local storage 230 and a storage adapter 228 interconnected by a system bus 223. The local storage 230 is utilized by the node to store local configuration information (i.e. management data) including its local copy of a replicated database (RDB) 850 (see FIG. 8).

The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein.

Each node 200 is illustratively embodied as a dual processor server system executing a storage operating system 400 that provides a file system configured to logically organize the information as a hierarchical structure of named directories and files on storage subsystem 300. However, it will be apparent to those of ordinary skill in the art that the node 200 may alternatively comprise a single or more than two processor system. Illustratively, one processor 222a executes the functions of the N-blade 110 on the node, while the other processor 222b executes the functions of the D-blade 500.

In the illustrative embodiment, the memory 224 comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 400, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the inventive system and method described herein.

The network adapter 225 comprises a plurality of ports adapted to couple the node 200 to one or more clients 180 over point-to-point links, wide area networks, virtual private networks implemented over a public network (Internet) or a shared local area network, hereinafter referred to as an Ethernet computer network 140. Therefore, the network adapter 225 may comprise a network interface card (NIC) having the mechanical, electrical and signaling circuitry needed to connect the node to the network. For such a network attached storage (NAS) based network environment, the clients are configured to access information stored on the node 200 as files. The clients 180 communicate with each node over network 140 by exchanging discrete frames or packets of data according to pre-defined protocols, such as the Transmission Control Protocol/Internet Protocol (TCP/IP).

The storage adapter 228 cooperates with the storage operating system 400 executing on the node 200 to access information requested by the clients. The information may be stored on disks or other similar media adapted to store information. The storage adapter comprises a plurality of ports having input/output (I/O) interface circuitry that couples to the disks over an I/O interconnect arrangement, such as a conventional high-performance, Fibre Channel (FC) link topology. The information is retrieved by the storage adapter and, if necessary, processed by the processor 222 (or the adapter 228 itself) prior to being forwarded over the system bus 223 to the network adapter 225 where the information is formatted into packets or messages and returned to the clients.

Figure 3:
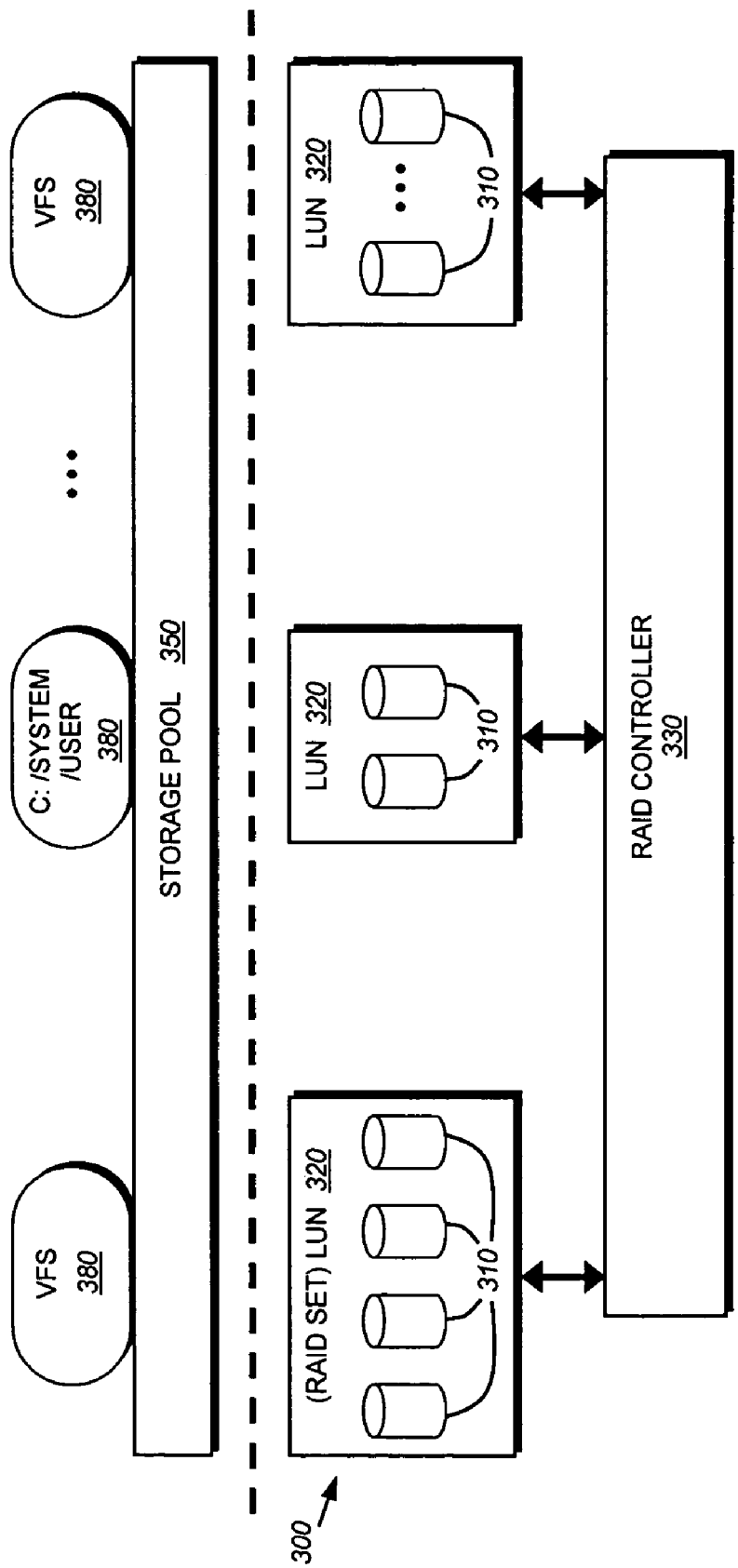
FIG. 3 is a schematic block diagram illustrating the storage subsystem that may be advantageously used with the present invention.

FIG. 3 is a schematic block diagram illustrating the storage subsystem 300 that may be advantageously used with the present invention. Storage of information on the storage subsystem 300 is illustratively implemented as a plurality of storage disks 310 defining an overall logical arrangement of disk space. The disks are further organized as one or more groups or sets of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, is may used in accordance with the present invention.

Each RAID set is illustratively configured by one or more RAID controllers 330. The RAID controller 330 exports a RAID set as a logical unit number (LUN) 320 to the D-blade 500, which writes and reads blocks to and from the LUN 320. One or more LUNs are illustratively organized as a storage pool 350, wherein each storage pool 350 is "owned" by a D-blade 500 in the cluster 100. Each storage pool 350 is further organized as a plurality of virtual file systems (VFSs) 380, each of which is also owned by the D-blade. Each VFS 380 may be organized within the storage pool according to a hierarchical policy that, among other things, allows the VFS to be dynamically moved among nodes of the cluster, thereby enabling the storage pool 350 to grow and shrink dynamically (on the fly).

In the illustrative embodiment, a VFS 380 is synonymous with a volume and comprises a root directory, as well as a number of subdirectories and files. A group of VFSs may be composed into a larger namespace. For example, a root directory (c:) may be contained within a root VFS ("/"), which is the VFS that begins a translation process from a pathname associated with an incoming request to actual data (file) in a file system, such as the SpinFS file system. The root VFS may contain a directory ("system") or a mount point ("user"). A mount point is a SpinFS object used to "vector off" to another VFS and which contains the name of that vectored VFS. The file system may comprise one or more VFSs that are "stitched together" by mount point objects.

C. Storage Operating System

To facilitate access to the disks 310 and information stored thereon, the storage operating system 400 implements a write-anywhere file system, such as the SpinFS file system, which logically organizes the information as a hierarchical structure of named to directories and files on the disks. However, it is expressly contemplated that any appropriate storage operating system, including a write in-place file system, may be enhanced for use in accordance with the inventive principles described herein. Each "on-disk" file may be implemented as set of disk blocks configured to store information, such as data, whereas the directory may be implemented as a specially formatted file in which names and links to other files and directories are stored.

As used herein, the term "storage operating system" generally refers to the computer-executable code operable on a computer that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the inventive system and method described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 4:
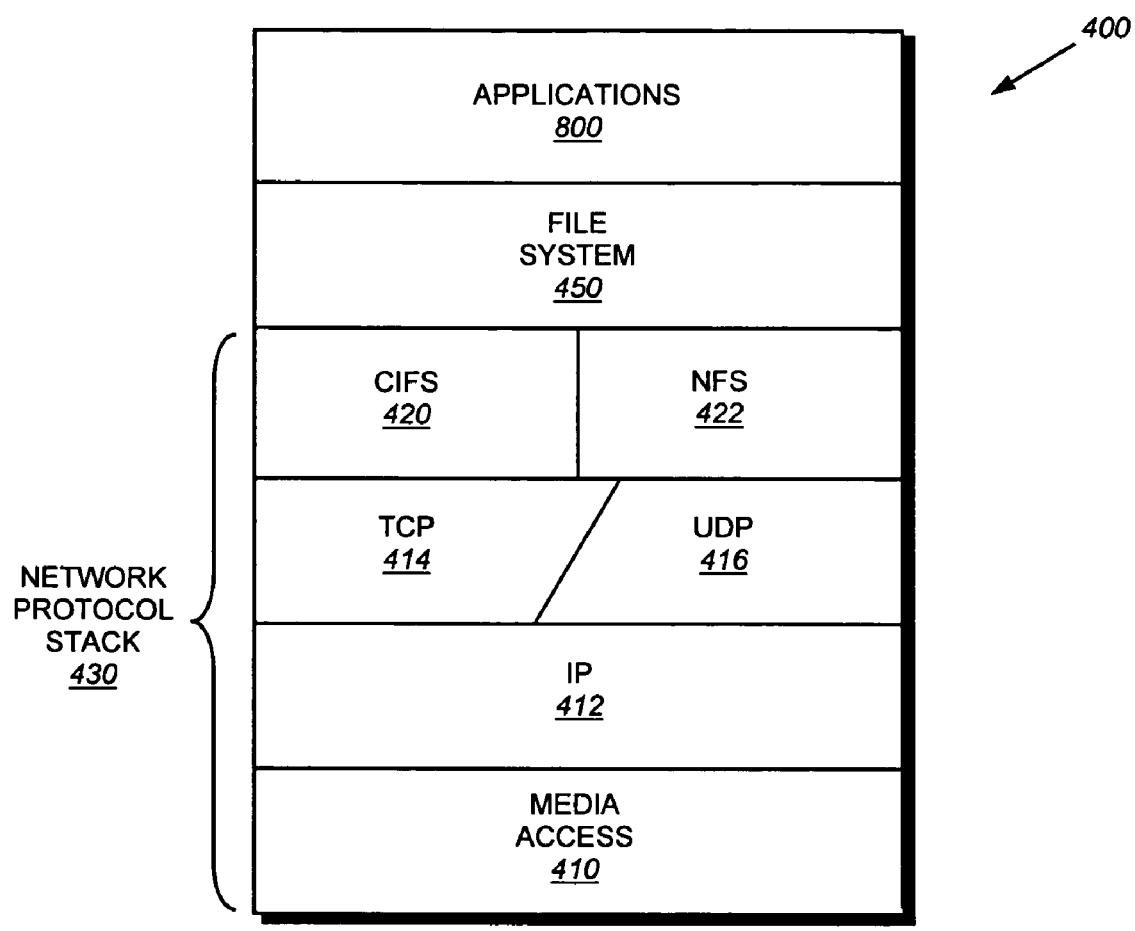
FIG. 4 is a partial schematic block diagram of a storage operating system that may be advantageously used with the present invention.

FIG. 4 is a partial schematic block diagram of the storage operating system 400 that may be advantageously used with the present invention. The storage operating system comprises a series of software layers organized to form an integrated network protocol stack 430 that provides a data path for clients to access information stored on the node 200 using file access protocols. The protocol stack includes a media access layer 410 of network drivers (e.g., gigabit Ethernet drivers) that interfaces to network protocol layers, such as the IP layer 412 and its supporting transport mechanisms, the TCP layer 414 and to the User Datagram Protocol (UDP) layer 416. A file system protocol layer provides multi-protocol file access to a file system 450 (the SpinFS file system) and, thus, includes support for the CIFS server 220 and the NFS server 222. As described further herein, a plurality of management processes executes as user mode applications 800.

In the illustrative embodiment, the processors 222 share various resources of the node 200, including the storage operating system 400. To that end, the N-blade 110 executes the integrated network protocol stack 430 of the operating system 400 to thereby perform protocol termination with respect to a client issuing incoming NFS/CIFS file access request packets over the cluster switching fabric 150. The NFS/CIFS layers of the network protocol stack function as NFS/CIFS servers 422, 420 that translate NFS/CIFS requests from a client into SpinFS protocol requests used for communication with the D-blade 500. The SpinFS protocol is a file system protocol that provides operations related to those operations contained within the incoming file access packets. Local communication between an N-blade and D-blade of a node is preferably effected through the use of message passing between the blades, while remote communication between an N-blade and D-blade of different nodes occurs over the cluster switching fabric 150.

D. D-Blade

Figure 5:
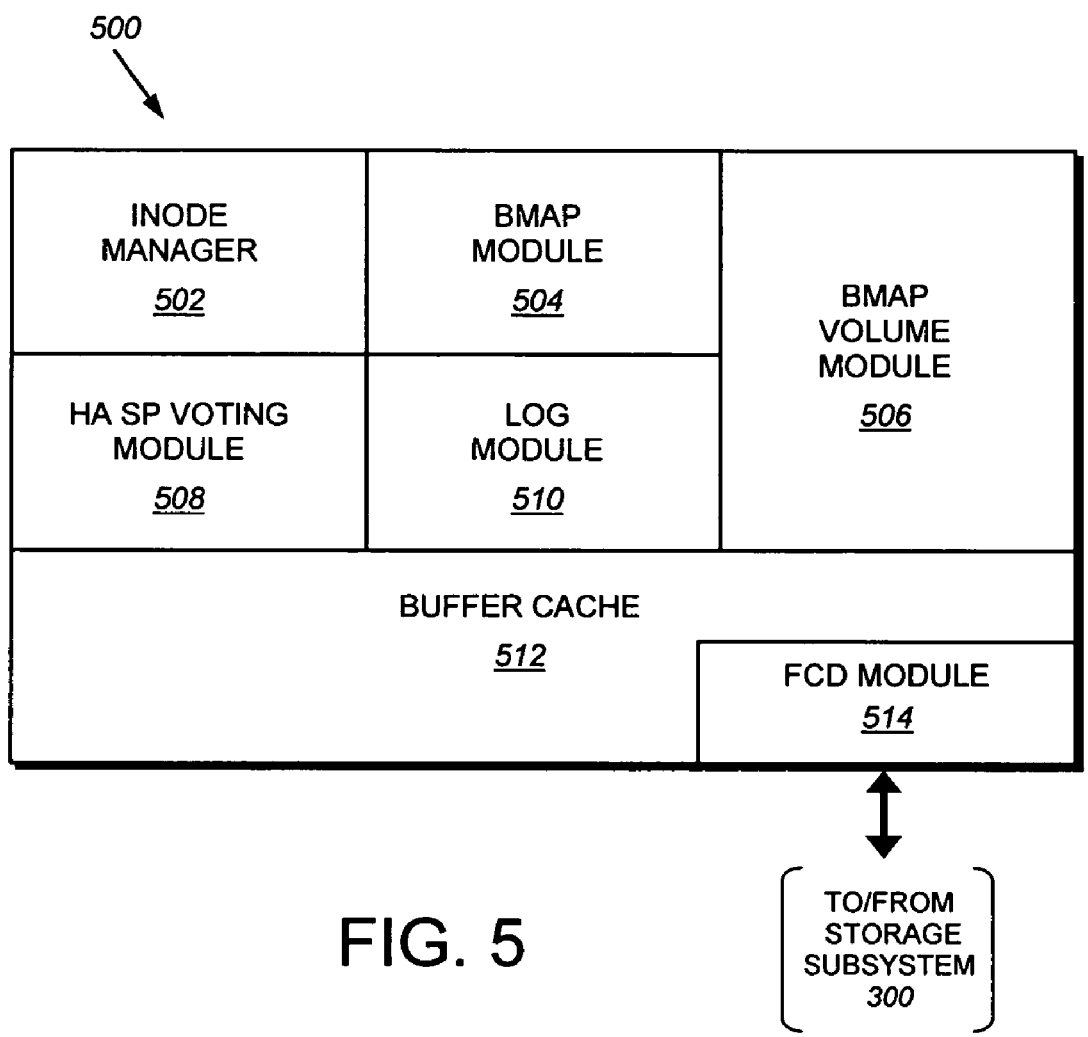
FIG. 5 is a schematic block diagram of a D-blade that may be advantageously used with the present invention.

Specifically, the NFS and CIFS servers of an N-blade 110 convert the incoming file access requests into SpinFS requests that are processed by the D-blades 500 of the cluster 100. Each D-blade 500 provides a disk interface function through execution of the SpinFS file system 450. In the illustrative cluster 100, the file systems 450 cooperate to provide a single SpinFS file system image across all of the D-blades 500 in the cluster. Thus, any network port of an N-blade that receives a client request can access any file within the single file system image located on any D-blade 500 of the cluster. FIG. 5 is a schematic block diagram of the D-blade 500 comprising a plurality of functional components including a file system processing module (the inode manager 502), a logical-oriented block processing module (the Bmap module 504) and a Bmap volume module 506. The inode manager 502 is the processing module that implements the SpinFS file system 450, whereas the Bmap module 504 is responsible for all block allocation functions associated with a write any-where policy of the file system 450, including reading and writing all data to and from the RAID controller 330 of storage subsystem 300. The Bmap module 504 also implements the novel data version tracking mechanism of the present invention. The Bmap volume module 506, on the other hand, implements all VFS operations in the cluster 100, including creating and deleting a VFS, mounting and unmounting a VFS in the cluster, moving a VFS, as well as cloning (snapshotting) and mirroring a VFS. The D-blade also includes a high availability storage pool (HA SP) voting module 508, a log module 510, a buffer cache 512 and a fibre channel device driver (FCD) 514.

E. SpinFS

Figure 6:
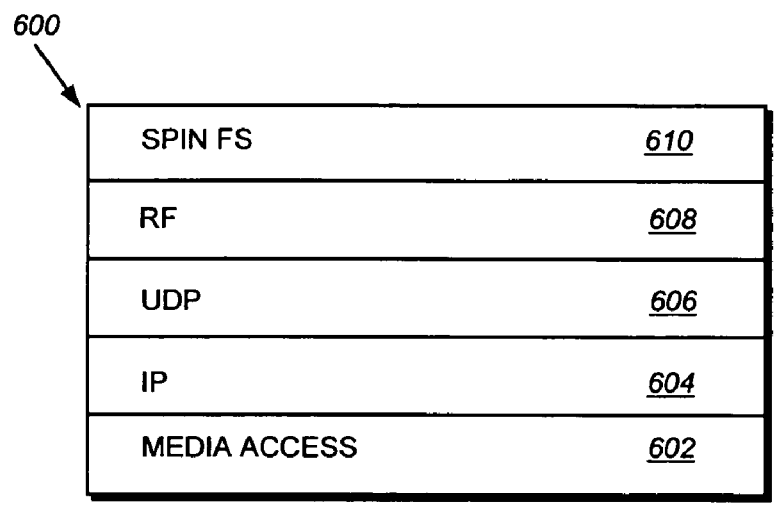
FIG. 6 is a schematic block diagram illustrating the format of a SpinFS request that may be advantageously used with the present invention.

The NFS and CIFS servers on the N-blade 110 translate respective NFS and CIFS requests into SpinFS primitive operations contained within SpinFS packets (requests). FIG. 6 is a schematic block diagram illustrating the format of a SpinFS request 600 that illustratively includes a media access layer 602, an IP layer 604, a UDP layer 606, an RF layer 608 and a SpinFS protocol layer 610. As noted, the SpinFS protocol 610 is a file system protocol that provides operations, related to those operations contained within incoming file access packets, to access files stored on the cluster 100. Illustratively, the SpinFS protocol 610 is datagram based and, as such, involves transmission of packets or "envelopes" in a reliable manner from a source (e.g., an N-blade) to a destination (e.g., a D-blade). The RF layer 608 implements a reliable transport protocol that is adapted to process such envelopes in accordance with a protocol, such as UDP 606.

Figure 7:
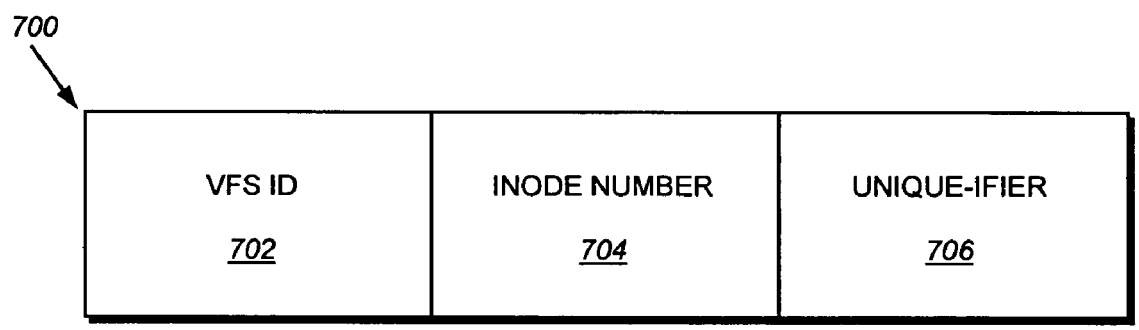
FIG. 7 is a schematic block diagram illustrating the format of a file handle that may be advantageously used with the present invention.

Files are accessed in the SpinFS file system 450 using a file handle. FIG. 7 is a schematic block diagram illustrating the format of a file handle 700 including a VFS ID field 702, an inode number field 704 and a unique-ifier field 706. The VFS ID field 702 contains an identifier of a VFS that is unique (global) within the entire cluster 100. The inode number field 704 contains an inode number of a particular inode within an inode file of a particular VFS. The unique-ifier field 706 contains, in the illustrative embodiment, a monotonically increasing number that uniquely identifies the file handle 700, particularly in the case where an inode number has been deleted, reused and reassigned to a new file. The unique-ifier 706 distinguishes that reused inode number in a particular VFS from a potentially previous use of those fields.

Figure 8:
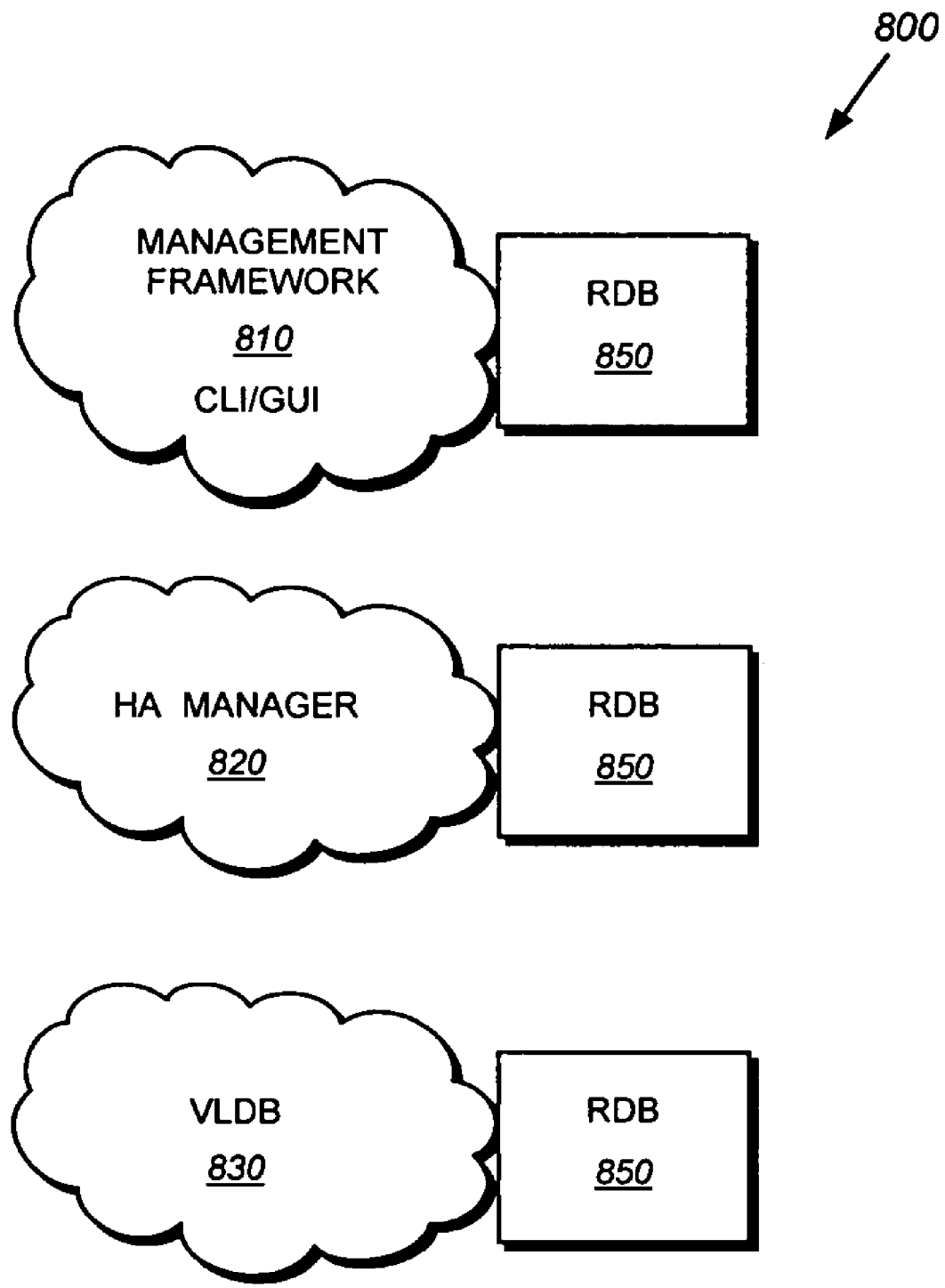
FIG. 8 is a schematic block diagram illustrating a collection of management processes that may be advantageously used with the present invention.

FIG. 8 is a schematic block diagram illustrating a collection of management processes that execute as user mode applications 800 on the storage operating system 400 to provide management of configuration information (i.e. management data) for the nodes of the cluster. To that end, the management processes include a management framework process 810, a high availability manager (HA Mgr) process 820, a VFS location database (VLDB) process 830, each utilizing a replicated database (RDB) 850 linked in as a library. The management framework 810 provides a user interface via a command line interface (CLI) and/or graphical user interface (GUI). The management framework is illustratively based on a conventional common interface model (CIM) object manager that provides the entity to which users/system administrators interact with a node 200 in order to manage the cluster 100.

The HA Mgr 820 manages all network addresses (IP addresses) of all nodes 200 on a cluster-wide basis. For example, assume a network adapter 225 having two IP addresses (IP1 and IP2) on a node fails. The HA Mgr 820 relocates those two IP addresses onto another N-blade of a node within the cluster to thereby enable clients to transparently survive the failure of an adapter (interface) on an N-blade 110. The relocation (repositioning) of IP addresses within the cluster is dependent upon configuration information provided by a system administrator. The HA Mgr 820 is also responsible for functions such as monitoring an uninterrupted power supply (UPS) and notifying the D-blade to write its data to persistent storage when a power supply issue arises within the cluster.

The VLDB 830 is a database process that tracks the locations of various storage components (e.g., a VFS) within the cluster 100 to thereby facilitate routing of requests throughout the cluster. In the illustrative embodiment, the N-blade 110 of each node has a look up table that maps the VFS ID 702 of a file handle 700 to a D-blade 500 that "owns" (is running) the VFS 380 within the cluster. The VLDB provides the contents of the look up table by, among other things, keeping track of the locations of the VFSs 380 within the cluster. The VLDB has a remote procedure call (RPC) interface, e.g., a Sun RPC interface, which allows the N-blade 110 to query the VLDB 830. When encountering a VFS ID 702 that is not stored in its mapping table, the N-blade sends an RPC to the VLDB process. In response, the VLDB 830 returns to the N-blade the appropriate mapping information, including an identifier of the D-blade that owns the VFS. The N-blade caches the information in its look up table and uses the D-blade ID to forward the incoming request to the appropriate VFS 380.

All of these management processes have interfaces to (are closely coupled to) a replicated database (RDB) 850. The RDB comprises a library that provides a persistent object store (storing of objects) for the management data processed by the management processes. Notably, the RDB 850 replicates and synchronizes the management data object store access across all nodes 200 of the cluster 100 to thereby ensure that this RDB database is identical (has an identical image) on all of the nodes 200. For example, the HA Mgr 820 uses the RDB library 850 to monitor the status of the IP addresses within the cluster. At system startup, each node 200 records the status/state of its interfaces and IP addresses (those IP addresses it "owns") into the RDB database.

Operationally, requests are issued by clients 180 and received at the network protocol stack 430 of an N-blade 110 within a node 200 of the cluster 100. The request is parsed through the network protocol stack to the appropriate NFS/CIFS server, where the specified VFS 380 (and file), along with the appropriate D-blade 500 that "owns" that VFS, are determined. The appropriate server then translates the incoming request into a SpinFS request 600 that is routed to the D-blade 500. The D-blade receives the SpinFS request and apportions it into a part that is relevant to the requested file (for use by the inode manager 502), as well as a part that is relevant to specific access (read/write) allocation with respect to blocks on the disk (for use by the Bmap module 504). All functions and interactions between the N-blade 110 and D-blade 500 are coordinated on a cluster-wide basis through the collection of management processes and the RDB library user mode applications 800.

Figure 9:
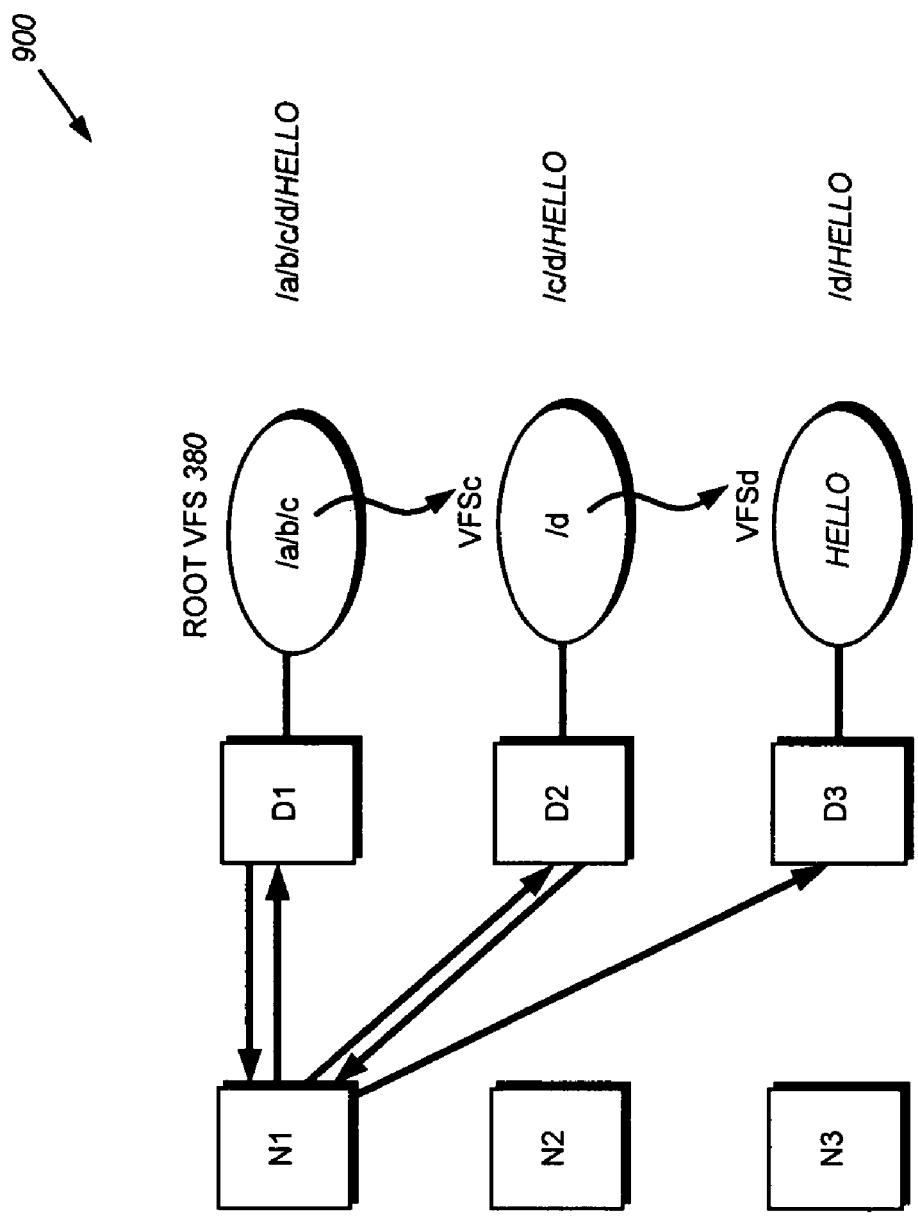
FIG. 9 is a schematic block diagram illustrating a distributed file system arrangement for processing a file access request in accordance with the present invention.

FIG. 9 is a schematic block diagram illustrating a distributed file system (SpinFS) arrangement 900 for processing a file access request at nodes 200 of the cluster 100. Assume a CIFS request packet specifying an operation directed to a file having a specified pathname is received at an N-blade 110 of a node 200. Specifically, the CIFS operation attempts to open a file having a pathname /a/b/c/d/Hello. The CIFS server 420 on the N-blade 110 performs a series of lookup calls on the various components of the pathname. Broadly stated, every cluster 100 has a root VFS 380 represented by the first "/" in the pathname. The N-blade 110 performs a lookup operation into the lookup table to determine the D-blade "owner" of the root VFS and, if that information is not present in the lookup table, forwards a RPC request to the VLDB 830 in order to obtain that location information. Upon identifying the D1 D-blade owner of the root VFS, the N-blade 110 forwards the request to D1, which then parses the various components of the pathname.

Assume that only a/b/ (e.g., directories) of the pathname are present within the root VFS. According to the SpinFS protocol, the D-blade 500 parses the pathname up to a/b/, and then returns (to the N-blade) the D-blade ID (e.g., D2) of the subsequent (next) D-blade that owns the next portion (e.g., c/) of the pathname. Assume that D3 is the D-blade that owns the subsequent portion of the pathname (d/Hello). Assume further that c and d are mount point objects used to vector off to the VFS that owns file Hello. Thus, the root VFS has directories a/b/ and mount point c that points to VFS c which has (in its top level) mount point d that points to VFS d that contains file Hello. Note that each mount point may signal the need to consult the VLDB 830 to determine which D-blade owns the VFS and, thus, to which D-blade the request should be routed.

The N-blade (N1) that receives the request initially forwards it to D-blade D1, which send a response back to N1 indicating how much of the pathname it was able to parse. In addition, D1 sends the ID of D-blade D2 which can parse the next portion of the pathname. N-blade N1 then sends to D-blade D2 the pathname c/d/Hello and D2 returns to N1 an indication that it can parse up to c/, along with the D-blade ID of D3 which can parse the remaining part of the pathname. N1 then sends the remaining portion of the pathname to D3 which then accesses the file Hello in VFS d. Note that the distributed file system arrangement 900 is performed in various parts of the cluster architecture including the N-blade 110, the D-blade 500, the VLDB 830 and the management framework 810.

F. Tracking Data Versions

The present invention comprises a system and method for managing data versions in a file system, such as file system 450. In an inode having both direct and indirect pointers, the inode is modified to include an inode version field and a direct version field. The direct version field contains a version number associated with direct blocks referenced (pointed to) by the inode, whereas the inode version field contains the highest version value for the direct blocks or any version value contained in an indirect block within a buffer tree of the inode. Each "leaf" indirect block, i.e., an indirect block that points to one or more data blocks, includes a data version field for each direct block pointer contained therein.

Illustratively, two different version values are maintained within the file system 450. A data version (DV) represents the current data in the file system, while a new data version (NDV) represents new data if the file system is changed. When data is written to a data container (such as a volume, file, etc), and the DV is less than the NDV, the file system increments the version associated with the data to the NDV value and tags the new data with the NDV by, for example, storing the value in the indirect block associated with the data block pointer. When a PCPI is generated of the data container, the PCPI inherits the DV and NDV from the active file system. A PCPI generally preserves the data version of an active file system; however if the data version is equal to the new data version, the file system 450 increments the new data version. Otherwise the data version and new data version remained unchanged. As a result, a PCPI does not directly change the data version but instead indicates that the PCPI contains the same data as that in the active file system when the PCPI was generated.

Figure 10:
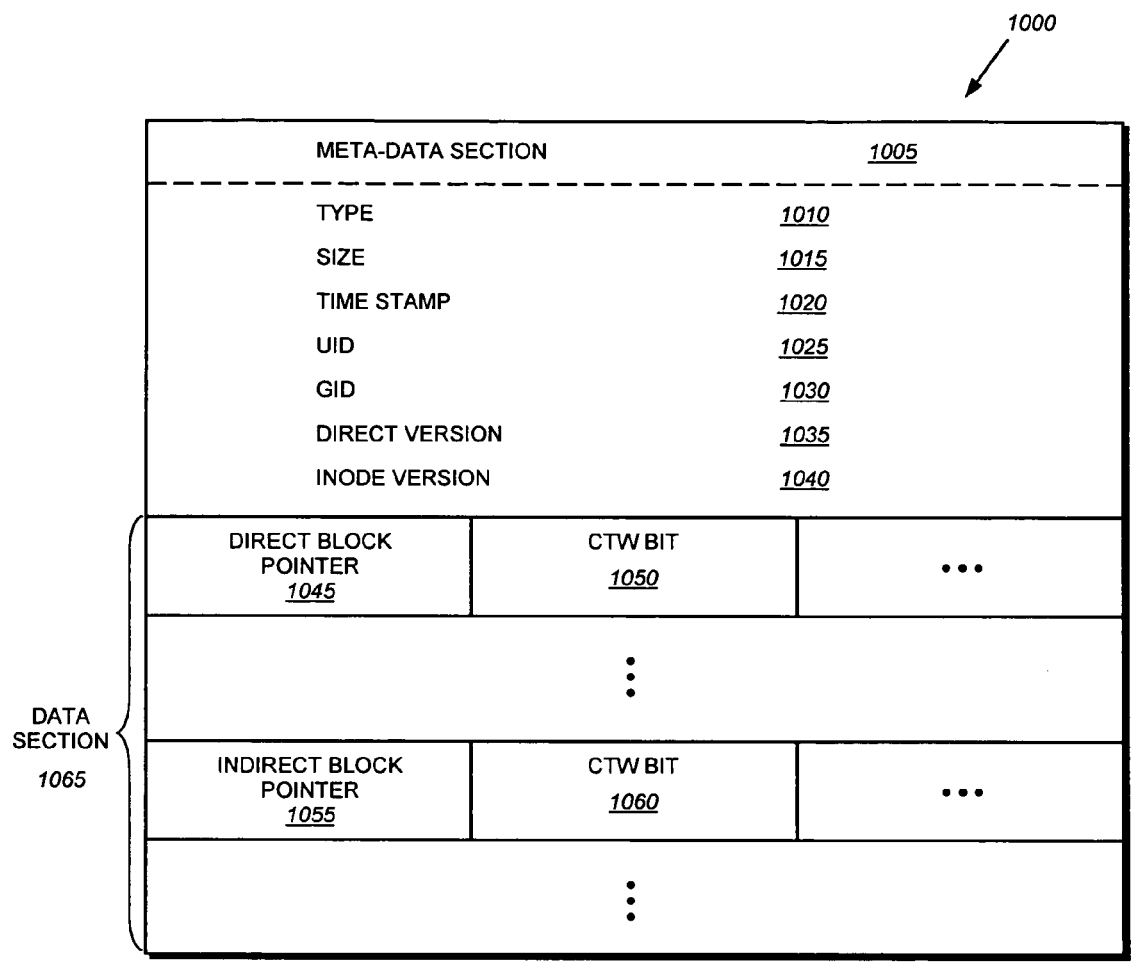
FIG. 10 is a schematic block diagram of an exemplary inode in accordance with an to embodiment the present invention.

In the illustrative embodiment, a VFS is represented in the file system by an inode data structure adapted for storage on disk. FIG. 10 is a schematic block diagram of an exemplary inode 1000 as used in an embodiment of the present invention. The inode 1000 includes a metadata section 1005 and a data section 1065. The information stored in the metadata section 1005 describes the VFS and, as such, includes the type 1010, size 1015, time stamps (e.g., access and/or modification) 1020 for the VFS, in addition to ownership information, i.e., user identifier (UID 1025) and group ID (GID 1030) along direct version field 1035 and inode version field 1040.

The data section 1065 of inode 1000 includes a plurality of direct block pointers 1045 and indirect block pointers 1055. Associated with each direct block pointer 1045 is a copy tree on write (CTW) bit 1050, indicating that the referenced block should not be freed if this volume is modified and that the block cannot be modified directly through this volume. Instead, when attempting to modify the referenced block, the file system first copies the block to a new location and modifies this copy. The indirect block pointers 1055 contain pointers to indirect blocks, which in turn, reference data blocks containing inodes. Similarly, each indirect block pointer field 1055 has a CTW bit 1060 associated therewith.

Figure 11:
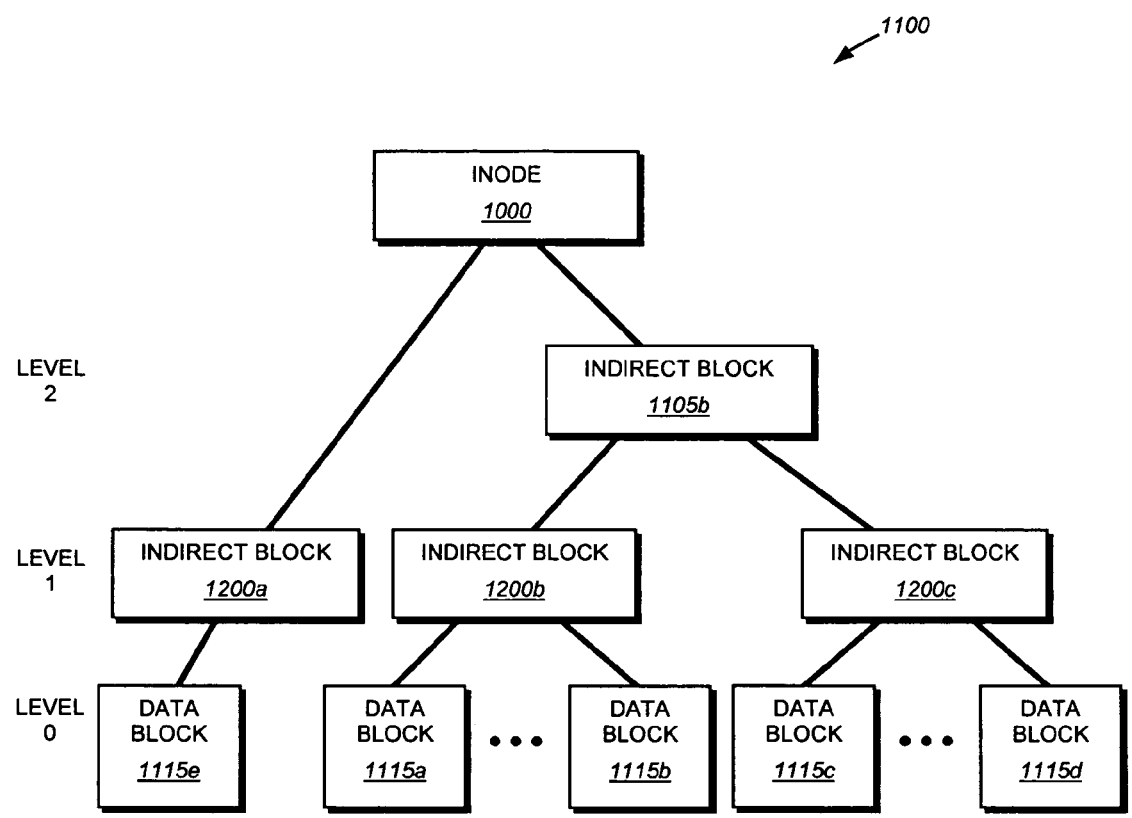
FIG. 11 is a schematic block diagram of an exemplary inode buffer tree in accordance with an embodiment the present invention.

FIG. 11 is a schematic block diagram of an exemplary inode buffer tree 1100 in accordance with an embodiment in the present invention. At the top (root) of the buffer tree 1100 of the VFS is an inode 1000, which may be stored within an inode file of the storage pool 350. The inode 1000 contains a series of indirect block pointers that points to indirect block 1105b and indirect block 1200a. Indirect block 1105b, in turn, contains pointers to additional low-level indirect blocks 1200b,c. At the base of the VFS are individual data blocks 1115a-e. Each data block illustratively represents a 4 KB disk block. The data blocks are labeled as direct or level 0 (L0) blocks 1115, whereas indirect blocks that point directly to data blocks are labeled as level 1 (L1) blocks 1200. Similarly, indirect blocks that point to L1 blocks are level 2 (L2) blocks 1105. Buffer tree 1100 is illustratively representative of a VFS having an inode with two levels of indirect blocks (L1 and L2), pointing to data blocks; however, it should be noted that the principle of the present invention applies to VFS's having any number of indirect blocks. Two levels of indirect blocks are shown for illustrative purposes only and should not be taken as limiting the present invention. In the illustrative embodiment, each Mode includes a pointer to a level 1 indirect block, a level 2 indirect block, a level 3 indirect block and a level 6 indirect block. Thus, for example, in the illustrative buffer tree 1100, mode 1000 points to a level 1 indirect block 1200a and a level 2 indirect block 1105b. However, as noted above, these pointers to various levels are exemplary only. In an alternate embodiment, an Mode may contain a plurality of pointers to differing levels of indirect blocks.

Figure 12:
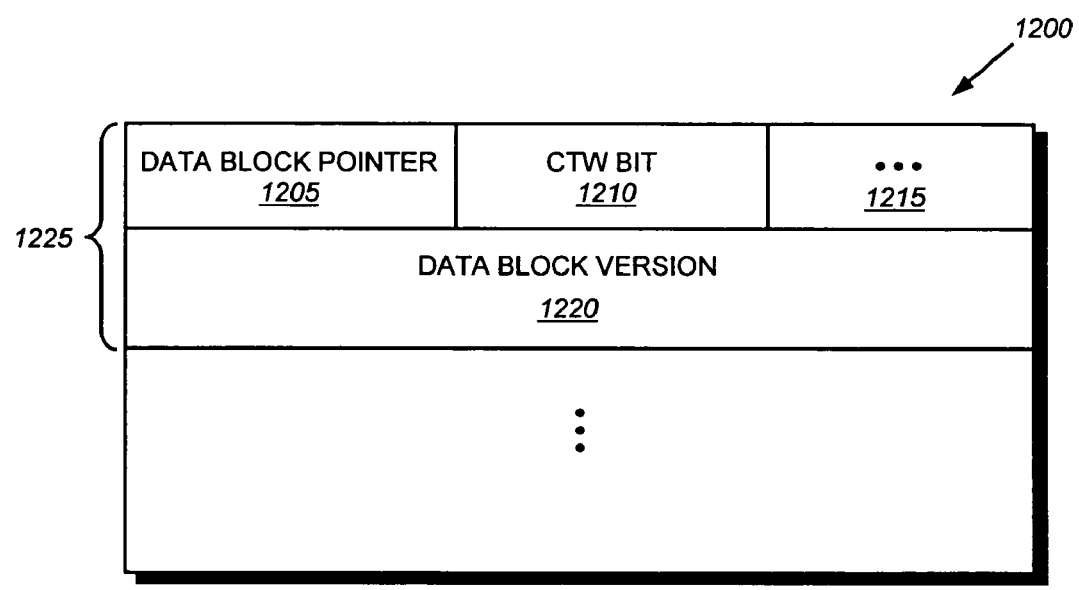
FIG. 12 is a schematic block diagram of an exemplary a level 1 indirect block parentheses lease block parentheses in accordance with an embodiment of the present invention.

FIG. 12 is a schematic block diagram of an exemplary level 1 indirect block 1200 in accordance with an embodiment of the present invention. The indirect block 1200 comprises of a plurality of block entries 1225. Each block entry 1225 comprises a data block pointer 1205, a CTW bit 1210, a data block version field 1220 and, in alternate embodiments additional fields 1215. In the illustrative embodiment, each indirect block 1200 comprises 256 block entries 1225. However, it should be noted that in alternate embodiments varying numbers of block entries 1225 may be utilized in accordance with the various embodiments of the invention.

The data block pointer 1205 comprises a unique identifier of the data block within the file system. The CTW bit 1210 is utilized by the file system to track whether the file system should copy the buffer tree on write as a result of a PCPI being previously generated. The use of a CTW bit is further described in the U.S. Provisional Patent Application Ser. No. 60/647,688, entitled TECHNIQUE FOR ACCELERATING THE CREATION OF A POINT IN TIME REPRESENTATION OF A FILE SYSTEM, by Bruce Leverett, et al. The data block version 1220, which in the illustrative embodiment is a 64-bit value, is utilized by the file system in accordance with the teachings of the present invention to track data versions. As described further below, the data block version 1220 maintains the version value associated with the data contained in the data block pointed to by the data block pointer 1205 of the block entry 1225. The data block version is incremented to a next data version (NDV) value when the data block pointed to by the data block pointer 1205 is modified subsequent to a PCPI. For example, if the data block version field 1220 contains a value of X, i.e., the current data version, and then a PCPI is generated. Subsequently, the data block is modified by, e.g., writing new data to the block. The data block version field 1220 is updated to X+1, i.e., the next data version value, in response to this modification.

Figure 13:
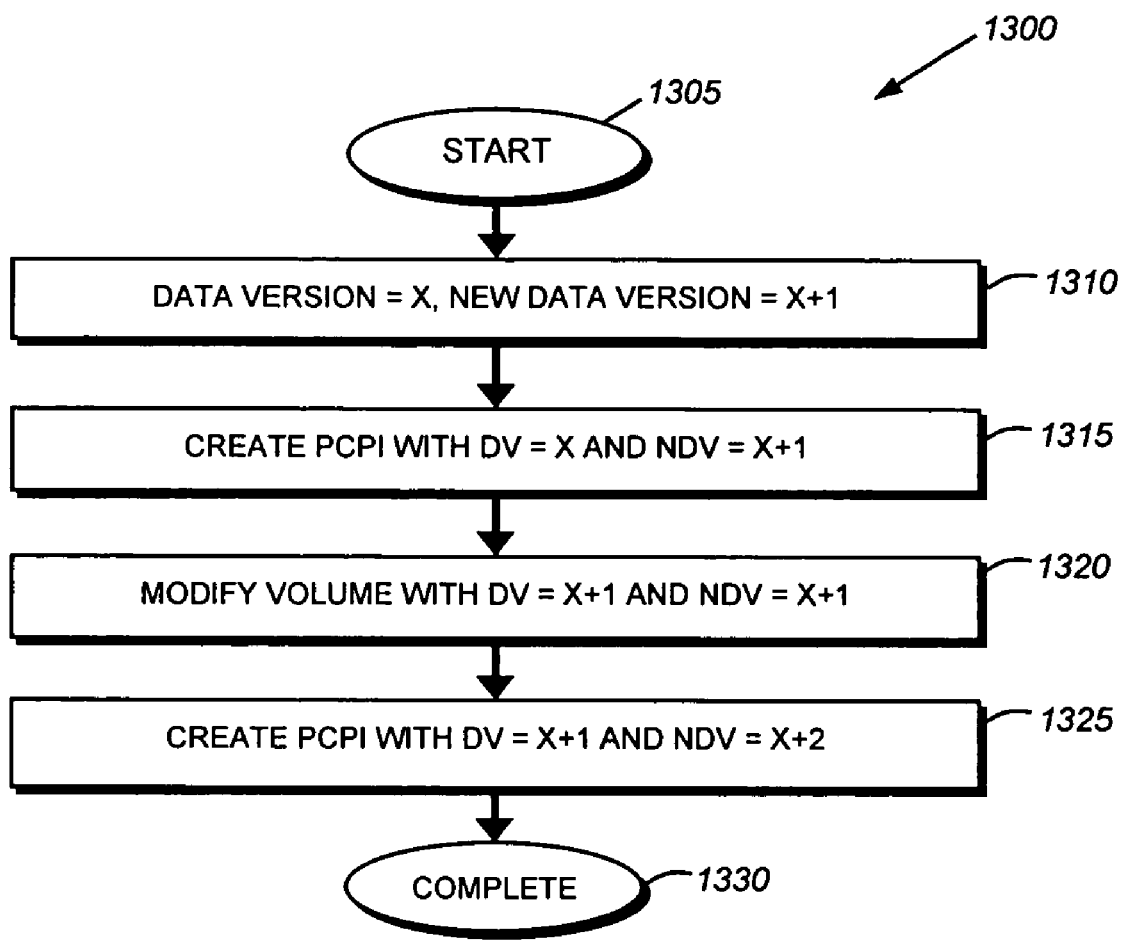
FIG. 13 is a flowchart detailing the steps of a procedure performed in modifying and a volume and generating a snapshot there in accordance with an embodiment of the present invention.

FIG. 13 is a flowchart detailing the steps of a procedure 1300 for tracking data versions in a file system and in accordance with an exemplary embodiment of the present invention. The procedure 1300 begins in step 1305 and continues to step 1310 wherein the current data version (DV) is equal to X and the new data version (NDV) is equal to X+1. At some point in time a PCPI is created in step 1315. The PCPI includes a DV of X and a NDV of X+1. In step 1320, the volume or other data container is modified so that the DV become X+1, while the NDV remains as X+1. That is, at the point in time of to completion of step 1320, both the data version and new data version are identical, which signifies that the data has changed from the previous instantiation of a point in time image of the volume or data container. As a result, when a PCPI is later created in step 1325, the PCPI contains a DV of X+1; however the NDV has been modified to be X+2. The procedure then completes in step 1330.

In the illustrative embodiment, the Bmap module 504 tracks the various changes and version values, however, in alternate embodiments, these functions may be performed by different modules of the file system or storage operating system. Generally, the present invention implements a set of rules for tracking data versions. First, when created, a volume (or other data container), it is initialized with DV of X and a NDV of X+1. Taking a volume offline (or bringing it back online) does not modify the version values of the volume. Any changes to the volume result in the changed data being marked with the NDV. When a PCPI is created, the value of the NDV becomes the DV and the NDV is incremented.

Thus, the present invention enables a replication system or any suitable replication technique to quickly determine the changed blocks in a volume without resorting to time consuming block by block comparisons. Specifically, blocks that have been changed since the last PCPI are marked with a DV equal to the value of the NDV. Unmodified blocks are marked with a version less than the NDV value. By scanning the data version fields 1220 in the level 1 indirect blocks 1200, the replication system may quickly determine those blocks that have been modified. Similarly, by examining the direct version field 1035 in the Mode 1000, the system may determine if any of the direct blocks 1115 have been modified. Of course, if the mode version field 1040 in the mode 1000 has not been incremented to the NDV value, then no blocks within the data container defined by the Mode have been modified.

Figure 14:
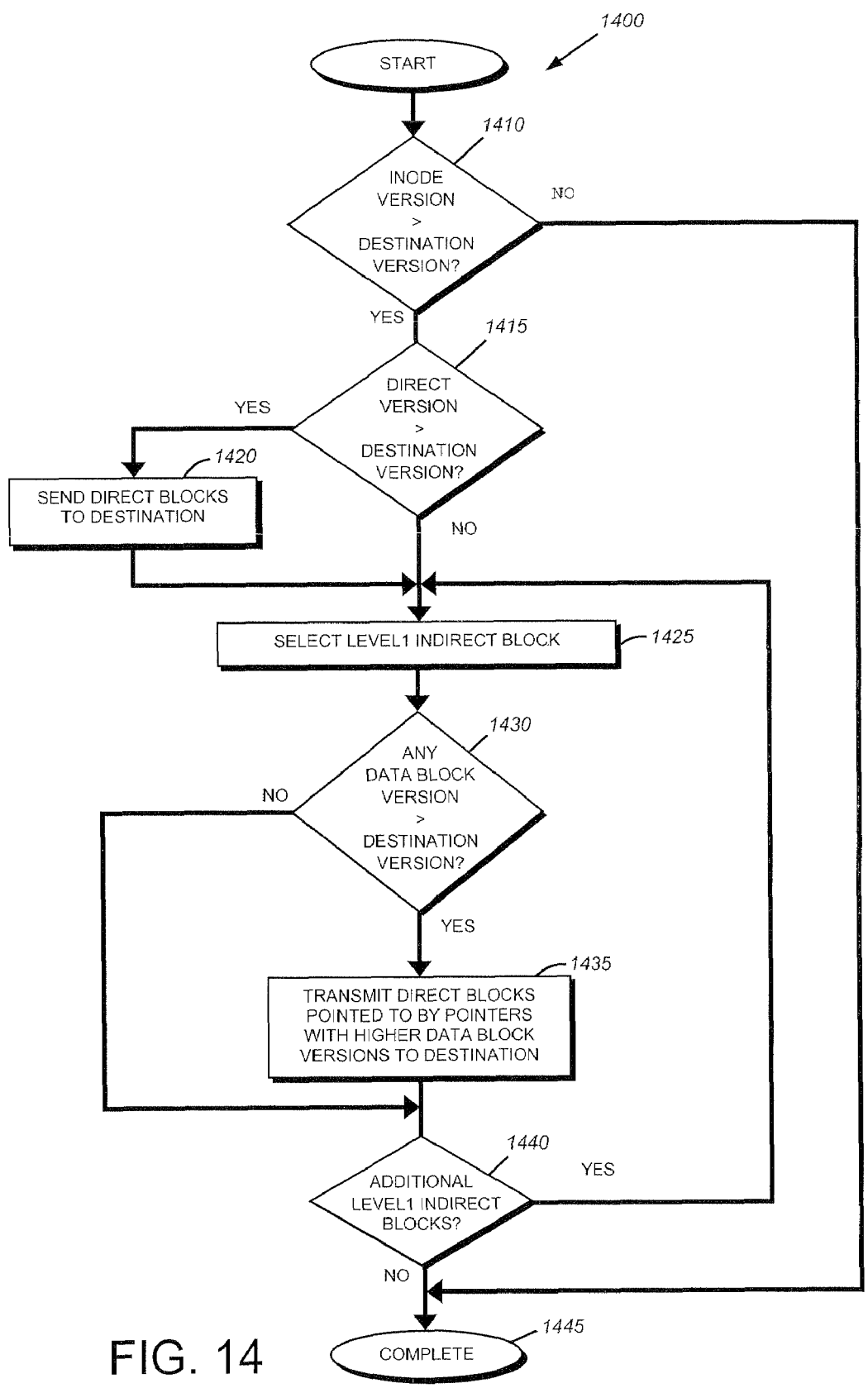
FIG. 14 is a flowchart detailing the steps of a procedure for replication in accordance with an embodiment of the present invention.

FIG. 14 is a flowchart detailing the steps of a procedure 1400 for identifying and replicating blocks from a source to a destination in accordance with an embodiment of the present invention. The procedure 1400 assumes that there has been a baseline copy of the data generated at the destination and that the baseline version includes a data version. It should be noted that the principles of the present invention are applicable to any relevant replication system or technique. As such, any acceptable data format, timing or mechanism may be utilized with the teachings of the present invention. The procedure 1400 begins in step 1405 continues to step 1410 where a determination is made whether the Mode version of the source is greater then that version of the destination ("destination version"). If the Mode version is not greater than the destination version then the data container (e.g., volume, vfs, etc.) identified by this Mode has not been modified relative to the version stored at the destination, i.e., the destination has the same version as the source. As such, the procedure branches to step 1445 and completes.

However, if the Mode version is greater than the destination version, the replication system proceeds to step 1415 where a determination is made whether the direct version stored in the Mode is greater than the destination version. If so, the procedure branches to step 1420 where the system sends the direct blocks pointed to by the Mode to the destination. As noted above, in the illustrative embodiment, the direct version field 1035 in the Mode 1000 is marked with the highest version value of any of the direct blocks. In alternate embodiments, each direct block pointed to by the Mode may have a separate version field.

If the direct version is not greater than the destination version, the procedure continues directly to step 1425, where a level 1 indirect block is selected and then, in step 1430 the replication system determines whether any data block version within that indirect block is greater than the destination version. If so, in step 1435, the system transmits those direct blocks referenced by pointers with data versions that are greater than the destination version. In step 1440 a determination is made whether any additional level 1 indirect blocks need to be processed. If so, the procedure returns to step 1425 and another level 1 indirect block is selected. If there are no additional level 1 indirect blocks to be processed, the procedure completes in step 1445.

Figure 15:
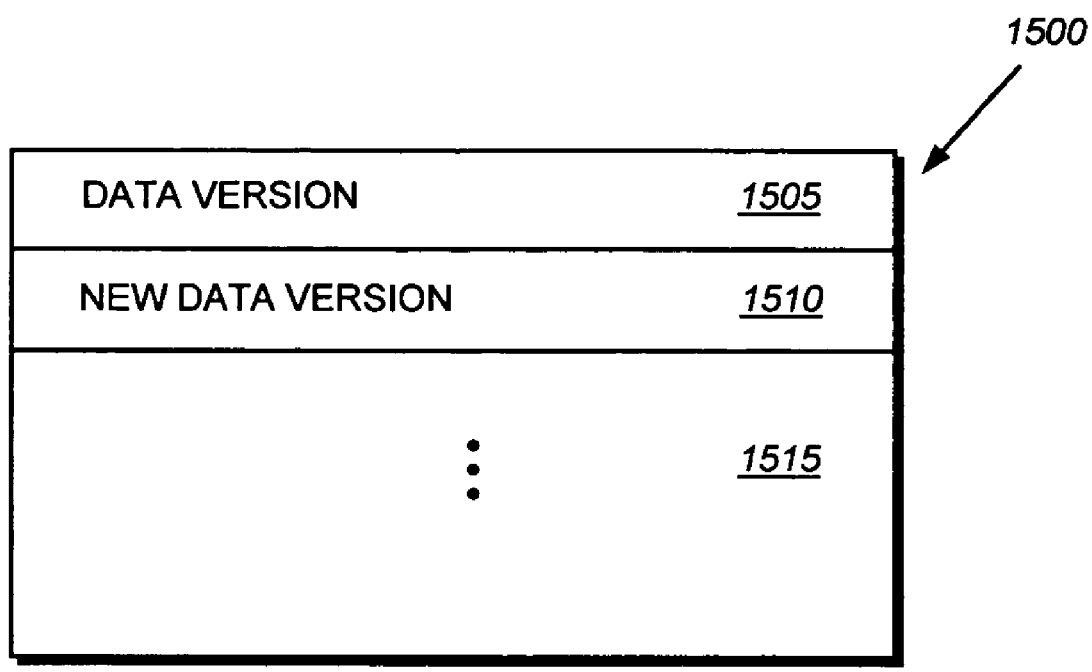
FIG. 15 is a schematic block diagram of an exemplary reserved block of a VFS (volume) for storing a data version and new data version in accordance with an embodiment of the present invention.

In the illustrative embodiment of the present invention, the storage system maintains the data version and new data version for each VFS in a reserved block within the VFS. The VFS data structure is generally described in the above-referenced U.S. Pat. No. 6,671,773 titled Method and System for Responding to File System Requests. FIG. 15 is a schematic block diagram of an exemplary reserved block 1500 in accordance with an embodiment of the present invention. The block 1500, which is a conventional block within the VFS, contains a data version field 1505, a new data version field 1510 and, in alternate embodiments, additional field 1515. The data version field 1505 stored the data version for the VFS. Similarly the new data version field 1510 stores the new data version for the VFS. When a VFS is mounted, the storage system determines the appropriate DV and NDV by examining the block 1500. Whenever any file (or other data container) within the VFS increments its DV, the VFS's DV is also incremented to reflect the fact that the VFS has been modified.

To again summarize, the present invention is directed to a system and method for managing changes of data versions in a file system. Each data block referenced by an indirect block has a data version associated therewith. When the data is modified, the version is changed from the current DV to a NDV value signifying that the block has been modified.

It should be noted that the present invention may be utilized with any acceptable inode or on-disk format. While this description has been written in terms of an on-disk format having an inode comprising 16 direct block pointers and four indirect block pointers, the teachings of the present invention may be applied to an on-disk format having any number of direct or indirect pointers. Similarly, while this description has been written in terms of level 1 indirect blocks comprising a data version, the data version may be located in any level of indirect block in accordance with various embodiments of the present invention.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-blades, the teachings of the present invention are equally suitable to systems where the functionality of the N and D-blades are implemented in a single system. Alternately, the functions of the N and D-blades may be distributed among any number of separate systems wherein each system performs one or more of the functions. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A computer implemented method for managing changes of data in a storage system, comprising:
    associating direct blocks and indirect blocks of the data in the storage system with a data version field;
    generating a persistent consistency point image (PCPI) of the storage system;
    storing the PCPI at a source device of the storage system;
    marking the data version field of the direct and indirect blocks of the data which have not been modified since the PCPI was generated with a first value;
    marking the data version field of the direct and indirect blocks of the data which have been modified since the PCPI was generated with a second value;
    scanning one or more of the data version fields of the direct and indirect blocks to determine which direct and indirect blocks have been modified since the PCPI was generated without comparing two or more versions of the data;
    transmitting to a destination device the direct and indirect blocks of the data having the data version field marked with the second value and not transmitting to the destination device the direct and indirect blocks of the data having the data version field marked with the first value; and
    storing at the destination device the direct and indirect blocks of the data having the data version field marked with the second value.

2. The method of claim 1 further comprising: associating the data version field with a direct block pointer.

3. The method of claim 1 further comprising: associating an inode version field in a root inode of the data with the data version field.

4. The method of claim 3 further comprising indicating, by the inode version field, if any blocks within a data container defined by the root inode has been modified since the PCPI was generated.

5. The method of claim 1 wherein the first value indicates a current data version and the second value indicates a next data version.

6. The method of claim 5 further comprising: incrementing the next data version when the PCPI is generated, whereby the current data version then equals the next data version.

7. A computer implemented system for managing changes of data versions in a storage system, comprising: the storage system configured to store a persistent consistency point image (PCPI) at a source device of the storage system;
   means for associating direct blocks and indirect blocks of the data in the storage system with a data version field;
   means for generating a persistent consistency point image (PCPI) of the storage system;
   means for storing the PCPI at the source device of the storage system;
   means for marking the data version field of the direct and indirect blocks of the data which have not been modified since the PCPI was generated with a first value;
   means for marking the data version field of the direct and indirect blocks of the data which have been modified since the PCPI was generated with a second value;
   means for scanning one or more of the data version fields of the direct and indirect blocks to determine which direct and indirect blocks have been modified since the PCPI was generated without comparing two or more versions of the data;
   means for transmitting to a destination device the direct and indirect blocks of the data having the data version field marked with the second value, and not transmitting to the destination device the direct and indirect blocks of the data having the data version field marked with the first value; and
   means for storing at the destination device the direct and indirect blocks of the data having the data version field marked with the second value.

8. The computer implemented system of claim 7 further comprising: means for associating the data version field with a direct block pointer.

9. The computer implemented system of claim 7 further comprising: means for associating an inode version field in a root inode of the data with the data version field.

10. The computer implemented system of claim 9 further comprising means for indicating, by the inode version field, if any blocks within a data container defined by the root inode have been modified since the PCPI was generated.

11. The computer implemented system of claim 7 wherein the first value indicates a current data version and the second value indicates a next data version.

12. The computer implemented system of claim 11 further comprising: means for incrementing the next data version when the PCPI is generated, whereby the current data version then equals the next data version.

13. A computer implemented system for managing changes of data versions in a computer storage system, comprising:
   a module configured to mark data version fields associated with direct blocks and indirect blocks of data with a current data version and further configured to modify respective data version fields associated with the direct blocks and indirect blocks of the data to a next data version in response to an operation modifying the respective direct blocks and indirect blocks of data subsequent to generation of a persistent consistency point image (PCPI), the computer storage system configured to determine which of the respective direct and indirect blocks have been modified since the PCPI was generated without comparing two or more versions of the data;
   the computer system further configured to transmit to a destination device the respective direct and indirect blocks of the data having the data version fields marked with the next data version and not transmit to the destination device the direct and indirect blocks of the data having the data version field marked with the current data version; and
   the computer system further configured to store at the destination device the direct and indirect blocks of the data having the data version field marked with the next data version.

14. The computer implemented system of claim 13 wherein the module comprises a bmap module.

15. The computer implemented system of claim 13 further comprising an inode version field in a root inode configured to indicate if any blocks within a data container defined by the root inode have been modified since the PCPI was generated.

16. The computer implemented system of claim 13 wherein the computer storage system is further configured to scan one or more of the data version fields of the direct and indirect blocks to determine which of the respective direct and indirect blocks have been modified since the PCPI was generated.

17. The computer implemented system of claim 16 wherein the PCPI is configured to inherit the current data version and the next data version of an active file system of the computer storage system when the PCPI is generated.

18. The computer implemented system of claim 13 wherein the data version field is maintained in a direct block data version field of an inode.

19. The computer implemented system of claim 13 wherein when the PCPI is generated, the PCPI maintains the current data version.

20. The computer implemented system of claim 19 wherein the computer storage system is further configured to increment the next data version when the PCPI is generated, whereby the current data version then equals the next data version.

21. A physical computer readable medium containing program instructions executed by a processor, comprising:
   program instructions that associate direct blocks and indirect blocks of data in a storage system with a data version field;
   program instructions that generate a persistent consistency point image (PCPI) of the storage system;
   program instructions that store the PCPI at a source device of the storage system;
   program instructions that mark the data version field of the direct and indirect blocks of the data which have not been modified since the PCPI was generated with a first value;
   program instructions that mark the data version field of the direct and indirect blocks of the data which have been modified since the PCPI was generated with a second value;
   program instructions that scan one or more of the data version fields of the direct and indirect blocks to determine which direct and indirect blocks have been modified since the PCPI was generated without comparing two or more versions of the data;
   program instructions that transmit to a destination device the direct and indirect blocks of the data having the data version field marked with the second value and not transmit to the destination device the direct and indirect blocks of the data having the data version field marked with the first; and program instructions that store at the destination device the direct and indirect blocks of the data having the data version field marked with the second value.

22. A computer implemented method, comprising:

associating a data version field of direct and indirect blocks with data on a source device;

marking the data version field of the direct and indirect blocks as a current data version;

generating a persistent consistency point image (PCPI) of the data;

storing the PCPI at the source device;

modifying one or more direct and indirect blocks of the data subsequent to the PCPI, and in response to the modification occurring subsequent to the PCPI, marking the data version field of the modified direct and indirect blocks of the data as a next data version;

scanning one or more of the data version fields of the direct and indirect blocks to determine which direct and indirect blocks have been modified since the PCPI was generated;

transmitting to a destination device the direct and indirect blocks of the data marked as the next data version, wherein that transmission does not include the direct and indirect blocks of the data marked with the current data version; and storing at the destination device the direct and indirect blocks of the data marked as the next data version.

23. The computer implemented method of claim 22 further comprising: associating the data version field with a direct block pointer.

24. The computer implemented method of claim 22 further comprising: associating an inode version field in a root inode of the data with the data version field.

25. The computer implemented method of claim 24 further comprising indicating, by the inode version field, if any blocks within a data container defined by the root inode have been modified since the PCPI was generated.

26. The computer implemented method of claim 22 wherein the scanning is completed without comparing two or more versions of the data.

27. The computer implemented method of claim 26 further comprising: incrementing the next data version when the PCPI is generated, whereby the current data version then equals the next data version.

28. A computer implemented method, comprising:

generating a persistent consistency point image (PCPI) of a source device;

storing the PCPI at the source device;

marking a data version field of each individually modified direct and indirect block of data at the source device, the marking associated with a new data version value only for the direct and indirect blocks of the data having been modified subsequent to the generation of the PCPI;

maintaining a data version field of each direct and indirect block of data at the source device that has not been modified subsequent to the generation of the PCPI, the maintained data version field associated with a current data version value only for the direct and indirect blocks of the data not having been modified subsequent to the generation of the PCPI;

scanning one or more of the data version fields of the direct and indirect blocks to determine which direct and indirect blocks have been modified subsequent to the generation of the PCPI;

replicating the PCPI of the source device on a destination device by transmitting to the destination device the modified direct and indirect blocks of the data having the direct and indirect blocks of the data version field marked with the new data version value and not transmitting to the destination device the unmodified direct and indirect blocks of the data having the direct and indirect blocks of the data version field maintained with the current data version value; and storing at the destination device the modified direct and indirect blocks of the data having the direct and indirect blocks of the data version field marked with the new data version value.

29. The computer implemented method of claim 28 further comprising: associating the data version field with a direct block pointer.

30. The computer implemented method of claim 28 further comprising: associating an inode version field in a root inode of the data with the data version field.

31. The computer implemented method of claim 30 further comprising indicating, by the inode version field, if any blocks within a data container defined by the root inode have been modified since the PCPI was generated.

32. The computer implemented method of claim 28 further comprising: maintaining the current data version value by the PCPI when the PCPI is generated.

33. A computer implemented method, comprising:

generating a first persistent consistency point image (PCPI) of data on a source device;

modifying at least some direct and indirect blocks of the data subsequent to the generation of the first PCPI;

marking a data version field associated with the direct and indirect blocks of modified data with a next data version value;

generating a second PCPI of the data on the source device, the second PCPI comprising the direct and indirect blocks of data unmodified since the first PCPI was generated and the direct and indirect blocks of the data modified since the first PCPI was generated, the direct and indirect blocks of the modified data marked with the next data version value;

scanning one or more of the data version fields of the direct and indirect blocks of the modified and unmodified data to determine which direct and indirect blocks have been modified since the first PCPI was generated;

replicating the second PCPI on a destination device by transmitting to the destination device only the data marked with the next data version value on the second PCPI; and storing at the destination device only the data marked with the next data version value on the second PCPI.

34. The computer implemented method of claim 33 further comprising: associating the data version field with a direct block pointer.

35. The computer implemented method of claim 32 further comprising: associating an inode version field in a root inode of the data with the data version field.

36. The computer implemented method of claim 35 further comprising indicating, by the inode version field, if any blocks within a data container defined by the root inode have been modified since the first PCPI was generated.

37. A computer implemented method for operating a data storage system, comprising:

indicating in a source computer system comprising direct and indirect blocks of data, whether the direct and indirect blocks of the data have been changed since a persistent consistency point image (PCPI) was generated, the direct and indirect blocks of the data comprising a field to indicate with a first value that a first group of direct and indirect blocks of the data has not been changed since the PCPI was generated, and having a second value indicating that a second group of direct and indirect blocks of the data has been changed since the PCPI was generated;

scanning one or more of the data version fields of the first group and second group of direct and indirect blocks to determine which direct and indirect blocks have been changed since the PCPI was generated without comparing two or more versions of the data;

transmitting to a destination computer system, in response to the field having the second value, one or more of the second group of direct and indirect blocks of the data changed since the PCPI was generated and not transmitting to the destination computer system, in response to the field having the first value, one or more of the first group of direct and indirect data blocks which have not been changed since the PCPI was generated; and storing at the destination device the one or more of the second group of direct and indirect blocks of the data changed since the PCPI was generated.

38. The computer implemented method of claim 37, further comprising:
associating an inode version field with a root inode of the data, wherein the inode version field indicates if any blocks within a data container defined by the root inode have been changed since the PCPI was generated.

39. A computer data storage system, comprising:
a source computer system comprising at least one indirect block of data, the indirect block of data configured to have a field to indicate with a first value that the indirect block of data has not been changed since a particular persistent consistency point image (PCPI) was generated, and a field configured to indicate with a second value that the indirect block of data has been changed since the particular PCPI was generated;
an operating system of the source computer system configured to scan at least one field of the indirect block to determine if the indirect block has been changed since the particular PCPI was generated, the operating system further configured to transmit one or more data blocks having the field of the indirect block of data with the second value to a destination computer system, wherein the operating system is further configured not to transmit one or more data blocks having the field of the indirect block of data with the first value to the destination computer system; and
the destination computer system configured to store the one or more data blocks having the field of the indirect block of data with the second value.

40. The computer data storage system as in claim 39, further comprising:
associating an inode version field with a root inode of the data, wherein the inode version field indicates if any blocks within a data container defined by the root inode have been changed since the particular PCPI was generated.

41. A computer implemented method for managing changes of data in a storage system, comprising:
associating a plurality of indirect blocks of data in the storage system with a data version field;
generating a persistent consistency point image (PCPI) of the storage system;
associating the plurality of indirect blocks of the data with a current version value;
modifying a first portion of indirect blocks of the plurality of indirect blocks after generating the PCPI, and not modifying a second portion of indirect blocks of the plurality of indirect blocks after generating the PCPI;
changing, in response to modifying the first portion of indirect blocks after the PCPI was generated, the association of the data version field of the first portion of indirect blocks from the current version value to a next version value;
maintaining, in response to the second portion of indirect blocks not being modified after the PCPI was generated, the association of the data version field of the second portion of indirect blocks with the current version value;
scanning the data version field of the plurality of indirect blocks to determine which of the indirect blocks have been modified after the PCPI was generated; and
transmitting to a destination device, in response to the scan determining that the first portion of indirect blocks have been modified after the PCPI was generated, the first portion of indirect blocks which had the data version field association changed to the next version value and not transmitting to the destination device the second portion of indirect blocks having maintained the data version field association with the current version value; and
storing at the destination device the first portion of indirect blocks which had the data version field association changed to the next version value.

42. A computer implemented method for managing changes of data in a storage system, comprising:
associating direct blocks and indirect blocks of data in the storage system with a data version field;
generating a persistent consistency point image (PCPI) of the storage system;
marking the data version field of the direct and indirect blocks which have not been modified since the PCPI was generated with a current version value;
marking the data version field of the direct and indirect blocks which have been modified since the PCPI was generated with a next version value;
scanning the data version field of the direct and indirect blocks to determine the direct and indirect blocks which have been modified since the PCPI was generated without comparing two or more versions of the data;
transmitting to a destination device the direct and indirect blocks having the data version field marked with the next version value, the direct and indirect blocks having the data version field marked with the current version value not being transmitted to the destination device; and
storing at the destination device the direct and indirect blocks having the data version field marked with the next version value.

43. A computer implemented method for managing changes of data in a storage system, comprising:
associating an inode version field with data blocks and indirect blocks within an inode, the indirect blocks having a data version field for at least one data block pointer contained in the indirect blocks;
associating a direct version field with the data blocks;
generating a persistent consistency point image (PCPI) of the storage system;
storing the PCPI at a source device of the storage system;

associating an inode version field value of the inode version field with a current data version value if no blocks within the inode have been modified since the PCPI was generated, and associating the inode version field value with a next data version value if any blocks within the inode have been modified since the PCPI was generated;

associating a data version field value of the data version field of the indirect blocks which have not been modified since the PCPI was generated with the current data version value and associating the data version field value of the indirect blocks which have been modified since the PCPI was generated with the next data version value;

marking a data version field value of the direct version field with the current data version value for each data block which has not been modified since the PCPI was generated and associating the direct version field value with the next data version value for each data block which has been modified since the PCPI was generated;

scanning the inode version field to determine if any blocks within the inode have been modified since the PCPI was generated, and scanning, in response to the inode version field being associated with the next data version value, the data version field and the direct version field to determine which indirect blocks and data blocks have been modified since the PCPI was generated without comparing two or more versions of the data;

transmitting to a destination device the indirect blocks and data blocks having the data version field associated with the next data version value, the indirect blocks and data blocks having the data version field associated with the current data version not being transmitted to the destination device; and storing at the destination device the indirect blocks and data blocks having the data version field associated with the next data version value.

\* \* \* \* \*

UNITED STATES PATENT AND TRADEMARK OFFICE
CERTIFICATE OF CORRECTION

PATENT NO. : 7,707,165 B1  Page 1 of 2
APPLICATION NO. : 11/008375
DATED : April 27, 2010
INVENTOR(S) : Tianyu Jiang It is certified that error appears in the above-identified patent and that said Letters Patent is hereby corrected as shown below:

Col. 6, line 10, please amend as shown:
dancy techniques, such as mirroring, ~~is~~ may be used in accor- Col. 11, line 49, please amend as shown:
embodiment, each ~~Mode~~ inode includes a pointer to a level 1 indi- Col. 11, line 52, please amend as shown:
buffer tree 1100, ~~mode~~ inode 1000 points to a level 1 indirect block Col. 11, line 55, please amend as shown:
an alternate embodiment, an ~~Mode~~ inode may contain a plurality of Col. 12, line 65, please amend as shown:
sion field 1035 in the ~~Mode~~ inode 1000, the system may determine Col. 12, line 67, please amend as shown:
course, if the ~~mode~~ inode version field 1040 in the ~~mode~~ inode 1000 has Col. 13, line 2, please amend as shown:
within the data container defined by the ~~Mode~~ inode have been Signed and Sealed this Twenty-seventh Day of July, 2010

David J. Kappos
*Director of the United States Patent and Trademark Office*

CERTIFICATE OF CORRECTION (continued)
U.S. Pat. No. 7,707,165 B1

Col. 13, line 15, please amend as shown:

determination is made whether the ~~Mode~~ <u>inode</u> version of the

Col. 13, line 17, please amend as shown:

nation version"). If the ~~Mode~~ <u>inode</u> version is not greater than the

Col. 13, line 19, please amend as shown:

etc.) identified by this ~~Mode~~ <u>inode</u> has not been modified relative to Col. 13, line 23, please amend as shown:

However, if the ~~Mode~~ <u>inode</u> version is greater than the destina-

Col. 13, line 26, please amend as shown:

stored in the ~~Mode~~ <u>inode</u> is greater than the destination version. If

Col. 13, line 28, please amend as shown:

sends the direct blocks pointed to by the ~~Mode~~ <u>inode</u> to the desti-

Col. 13, line 30, please amend as shown:

direct version field 1035 in the ~~Mode~~ <u>inode</u> 1000 is marked with the Col. 13, line 32, please amend as shown:

embodiments, each direct block pointed to by the ~~Mode~~ <u>inode</u> may